(12) United States Patent
Srinivasan

(10) Patent No.: US 9,792,277 B2
(45) Date of Patent: Oct. 17, 2017

(54) SYSTEM AND METHOD FOR DETERMINING THE MEANING OF A DOCUMENT WITH RESPECT TO A CONCEPT

(71) Applicant: Venkat Srinivasan, Weston, MA (US)

(72) Inventor: Venkat Srinivasan, Weston, MA (US)

(73) Assignee: RAGE Frameworks, Inc., Dedham, MA (US)

( * ) Notice: Subject to any disclaimer, the term of this patent is extended or adjusted under 35 U.S.C. 154(b) by 17 days.

(21) Appl. No.: 14/583,502

(22) Filed: Dec. 26, 2014

(65) Prior Publication Data
US 2016/0188568 A1 Jun. 30, 2016

(51) Int. Cl.
*G06F 17/27* (2006.01)
(52) U.S. Cl.
CPC ................. *G06F 17/2785* (2013.01)
(58) Field of Classification Search
CPC .......................................... G06F 17/27–17/30
See application file for complete search history.

(56) References Cited

U.S. PATENT DOCUMENTS

| | | | | |
|---|---|---|---|---|
| 5,809,476 A | * | 9/1998 | Ryan | G06Q 50/22 704/9 |
| 2010/0114899 A1 | * | 5/2010 | Guha | G06F 17/30867 707/741 |
| 2014/0129213 A1 | * | 5/2014 | Kimelfeld | G06F 17/271 704/9 |
| 2015/0331850 A1 | * | 11/2015 | Ramish | G06F 17/28 704/9 |

* cited by examiner

*Primary Examiner* — Kevin Ky
(74) *Attorney, Agent, or Firm* — William L. Botjer

(57) ABSTRACT

A computerized method for determining an impact of a document on the specific concept of interest. The method can be configured to identify a cluster of clauses or sentences from a plurality of semantically similar clauses of the document and determine one or more representative concepts for the cluster of the document. An impact of each clause of the cluster is determined using one or more semantic parameters and impact analysis rules. The impact of the each sentence of the cluster is then determined using the impact of the respective clauses and subsequently, the impact of the cluster is determined using the impact of the respective sentences. Based on the impact of the cluster, an impact of the document on the one or more representative concepts is determined.

26 Claims, 25 Drawing Sheets

Cold weather slams U.S. factory output, spurs growth fears (Reuters) - U.S. manufacturing output unexpectedly fell in January, recording its biggest drop in more than 4-1/2 years, as cold weather disrupted production in the latest indication the economy got off to a weak start this year.

Though consumer sentiment was steady in early February, there are worries the persistent and widespread harsh weather could dampen the morale of households, whose budgets are being stretched by soaring heating bills.

"The big question is whether the U.S. economy is slowing significantly or whether it is merely going through a soft patch caused by extreme weather. The evidence points to the latter," said Chris Williamson, chief economist at Markit in London.

Factory production fell 0.8 percent last month, the Federal Reserve said on Friday. It was the first drop since July and the biggest since May 2009, when the economy was still locked in recession. Output had increased 0.3 percent in December.

The Fed said "severe weather ... curtailed production in some regions of the country." Economists polled by Reuters had expected manufacturing output to edge up 0.1 percent.

A separate report showed the Thomson Reuters/University of Michigan index of consumer sentiment stood at 81.2 early this month, unchanged from January. The survey's barometer of current economic conditions fell to 94.0 from 96.8 in January.

"The good news is that confidence proved resilient to recent government reports of weak growth in income and employment," survey director Richard Curtin said.

FIGURE 7A

S0: Cold weather slams U.S. factory output, spurs growth fears.

S1: U.S. manufacturing output unexpectedly fell in January, recording its biggest drop in more than 4-1/2 years, as cold weather disrupted production in the latest indication the economy got off to a weak start this year.

S2: Though consumer sentiment was steady in early February, there are worries the persistent and widespread harsh weather could dampen the morale of households, whose budgets are being stretched by soaring heating bills.

S3: "The big question is whether the U.S. economy is slowing significantly or whether it is merely going through a soft patch caused by extreme weather. The evidence points to the latter," said Chris Williamson, chief economist at Markit in London.

S4: Factory production fell 0.8 percent last month, the Federal Reserve said on Friday.

S5: It was the first drop since July and the biggest since May 2009, when the economy was still locked in recession.

S6: Output had increased 0.3 percent in December.

S7: The Fed said "severe weather ... curtailed production in some regions of the country."

S8: Economists polled by Reuters had expected manufacturing output to edge up 0.1 percent.

S9: A separate report showed the Thomson Reuters/University of Michigan index of consumer sentiment stood at 81.2 early this month, unchanged from January.

S10: The survey's barometer of current economic conditions fell to 94.0 from 96.8 in January.

Cluster 0: *Cold weather, U.S. Factory Output, U.S. manufacturing Output*
S0: Cold weather slams U.S. factory output, spurs growth fears.
S1: U.S. manufacturing output unexpectedly fell in January, recording its biggest drop in more than 4-1/2 years, as cold weather disrupted production in the latest indication the economy got off to a weak start this year.

Cluster 1: *An economic soft patch, Slowing U.S. Economy, Chris Williamson*
S3: "The big question is whether the U.S. economy is slowing significantly or whether it is merely going through a soft patch caused by extreme weather. The evidence points to the latter," said Chris Williamson, chief economist at Markit in London.

Cluster 2: *Federal Reserve, Factory Production*
S4: Factory production fell 0.8 percent last month, the Federal Reserve said on Friday.
S5: It was the first drop since July and the biggest since May 2009, when the economy was still locked in recession.
S6: Output had increased 0.3 percent in December.
S7: The Fed said "severe weather curtailed production in some regions of the country."

Cluster 3: *Expected manufacturing Output*
S8: Economists polled by Reuters had expected manufacturing output to edge up 0.1 percent.

Cluster 4: *Consumer sentiment*
S2: Though consumer sentiment was steady in early February, there are worries the persistent and widespread harsh weather could dampen the morale of households, whose budgets are being stretched by soaring heating bills.
S9: A separate report showed the Thomson Reuters/University of Michigan index of consumer sentiment stood at 81.2 early this month, unchanged from January.
S10: The survey's barometer of current economic conditions fell to 94.0 from 96.8 in January.

URL: http://www.reuters.com/article/2014/05/05/us-usa-pensions-returns-idUSBREA44027201405055
Title: U.S. public pensions outperform peers in first quarter: data

S0: U.S. public pensions outperform peers in first quarter: data

S1: U.S. public pension funds returned a median 1.87 percent in the first quarter of 2014, slightly outperforming the 1.66 percent returns for the larger universe of institutional investment plans, according to a report to be released on Monday.

S2: The results this year are far below the first quarter of last year, when public pensions returned a median 5.2 percent.

S3: However, the annual median return for public funds remains high, at 12.94 percent, after the first quarter of 2014, the data from the Wilshire Trust Universe Comparison Service showed.

S4: Double-digit annual returns in 2013 began to give states' and cities' retirement systems a chance to start implementing reforms to fix gaping deficits.

S5: Wilshire's report covers nearly 1,700 different plans - including foundations, endowments and corporate funds - representing more than $3.5 trillion in assets.

S6: By comparison, the Wilshire 5000 Total Market Index returned 2.04 percent, while the Barclays U.S. Aggregate Index returned 1.84 percent for the quarter.

FIGURE 14

Cluster 0 (Primary Cluster)

S0: U.S. public pensions outperform peers in first quarter: data

S0-CL0: U.S. public pensions outperform peers in first quarter: data

S1: U.S. public pension funds returned a median 1.87 percent in the first quarter of 2014, slightly outperforming the 1.66 percent returns for the larger universe of institutional investment plans, according to a report to be released on Monday.

S1-CL0: U.S. public pension funds returned a median 1.87 percent in the first quarter of 2014, according to a report to be released on Monday.

S1-CL1: U.S. public pension funds slightly outperform the 1.66 percent returns for the larger universe of institutional investment plans, according to a report to be released on Monday.

S2: The results this year are far below the first quarter of last year, when public pensions returned a median 5.2 percent.

S2-CL0: The results this year are far below the first quarter of last year

S2-CL1: When public pensions returned a median 5.2 percent.

S3: However, the annual median return for public funds remains high, at 12.94 percent, after the first quarter of 2014, the data from the Wilshire Trust Universe Comparison Service showed.

S3-CL0: However, the annual median return for public funds remains high, at 12.94 percent, after the first quarter of 2014, the data from the Wilshire Trust Universe Comparison Service showed.

S4: Double-digit annual returns in 2013 began to give states' and cities' retirement systems a chance to start implementing reforms to fix gaping deficits.

S4-CL0: Double-digit annual returns in 2013 began to give states' and cities' retirement systems a chance to start implementing reforms to fix gaping deficits.

FIGURE 15A

Cluster 1

Cluster 1:

S5: Wilshire's report covers nearly 1,700 different plans - including foundations, endowments and corporate funds - representing more than $3.5 trillion in assets.

S5-CL0: Wilshire's report covers nearly 1,700 different plans - including foundations, endowments and corporate funds

S5-CL1: different plans representing more than $3.5 trillion in assets.

S6: By comparison, the Wilshire 5000 Total Market Index returned 2.04 percent, while the Barclays U.S. Aggregate Index returned 1.84 percent for the quarter.

S6-CL0: the Wilshire 5000 Total Market Index returned 2.04 percent

S6-CL1: the Barclays U.S. Aggregate Index returned 1.84 percent for the quarter.

FIGURE 15B

Cluster 0 (Primary Cluster) 1600

| Semantic Descriptors | Sentence S0 Cluster 0.0 | Sentence S1 Cluster 0.1 | Sentence S2 Cluster 0.1 |
|---|---|---|---|
| Representative Concept | U.S. public pensions | the annual median return for public funds | Annual Returns |
| Ontology Concept | Performance of Public Funds | Performance of Public Funds | Performance of Public Funds |
| Impact | outperform | remains | began to give to start to fix |
| Verb Class | better | is | start, provide, start, better |
| Object | peers | high | gaping deficits |
| Quantity | | 12.94 percent | |
| Time-Period | first quarter | after the first quarter of 2014 | 2013 |
| Intensity | - | - | Double-digit |
| Attribution | data | the data from the Wilshire Trust Universe Comparison Service | |
| Rating (Impact) | - | Neutral | 1 |
| Rating (Object) | - | Positive (1.0) | 1.2 |
| Rating (intensity) | - | - | 1.2 |
| Clause Rating | 1.0 | 1 | 1.2 |
| Inter-sentence Marker | - | However | - |
| Sentence Rating | 1.0 | 1.0 | 1.2 |

FIGURE 16A

Cluster 0 (Primary Cluster)

| Sentence Attributes | Sentence S1 Clause C1.1 | Sentence S1 Clause C1.2 | Sentence S2 Clause C2.1 | Sentence S2 Clause C2.2 |
|---|---|---|---|---|
| Representative Concept | U.S. public pension funds | U.S. public pension funds | The results | public pensions |
| Ontology Concept | Performance of Public Funds | Performance of Public Funds | Performance of Public Funds | Performance of Public Funds |
| Impact | returned | outperform | are | returned |
| Verb Class | result | better | is | result |
| Intensity | - | slightly | far | - |
| Quantity | median 1.87 percent | 1.66 percent | - | median 5.2 percent |
| Object | - | larger universe of institutional investment plans | below the first quarter of last year | - |
| Time-Period | first quarter of 2014 | - | this year | - |
| Attribution | a report to be released on Monday | a report to be released on Monday | - | - |
| Rating (Impact) | - | 1 | Neutral (0) | - |
| Rating (Intensity) | - | 0.8 | Negative (-1.0) | - |
| Rating (Object) | - | - | 2 | - |
| Clause Rating | Neutral | 0.8 | -2.0 (Significantly Negative) | Neutral |
| Sentence Rating | 0+0.8 = 0.8 | | -2.0+0 = -2.0 | |

FIGURE 16B

Cluster 1

| Semantic Properties | Sentence 5 | | | Sentence 6 | |
|---|---|---|---|---|---|
| | Clause 5.1 | Clause 5.2 | Clause 5.3 | Clause 6.1 | Clause 6.2 |
| Representative Concept | Wilshire's report | different plans | | Wilshire 5000 Total Market Index | Barclays U.S. Aggregate Index |
| Ontology Concept | NONE | NONE | | NONE | NONE |
| Impact | covers | representing | | returned | returned |
| Verb Class | Contains | Contains | | result | result |
| Intensity | Nearly | more than | | - | 2.04 percent |
| Quantity | 1,700 | $3.5 trillion | | 2.04 percent | the quarter |
| Object | | different plans - including foundations, endowments and corporate funds | | - | - |
| Time-Period | - | - | | - | - |
| Attribution | - | | | - | - |
| Rating (Impact) | Neutral | Neutral | | Neutral | Neutral |
| Rating (Intensity) | - | | | - | - |
| Rating (Object) | - | | | - | - |
| Clause Rating | 0 | 0 | | 0 | 0 |
| Sentence Rating | 0+0= 0 | | | 0+0 = 0 | |

FIGURE 16C

| Rule ID | Representative Concept | Verb Class | Impact |
|---|---|---|---|
| 1 | Performance of Public Funds | Better | Positive (1.0) |
| 2 | Performance of Public Funds | Result | Neutral |
| 3 | Performance of Public Funds | Is | Neutral |
| 4 | Performance of Public Funds | Contains | Neutral |
| 5 | Performance of Public Funds | Contains | Neutral |

SYSTEM AND METHOD FOR DETERMINING THE MEANING OF A DOCUMENT WITH RESPECT TO A CONCEPT

CROSS REFERENCE TO RELATED APPLICATIONS

This application is a CIP of U.S. patent application Ser. No. 12/963,907 filed Dec. 9, 2010, the disclosure of which is hereby incorporated by reference. This application is also related to U.S. patent application Ser. No. 14/580,744 filed Dec. 23, 2014 entitled "SYSTEM AND METHOD FOR GENERATING A TRACTABLE SEMANTIC NETWORK FOR A CONCEPT" and to U.S. patent application Ser. No. 14/582,587 filed Dec. 24, 2014 entitled "SYSTEM AND METHOD FOR DOCUMENT CLASSIFICATION BASED ON SEMANTIC ANALYSIS OF THE DOCUMENT". The disclosure of these applications are also hereby incorporated by reference.

TECHNICAL FIELD

The present application relates generally to natural language processing technology. In particular, the application relates to system and method for determining the meaning of a document with respect to a concept or the impact of the document's content on a concept.

BACKGROUND

Digital data has been growing at an enormous pace and much of this growth, as much as 80% is unstructured data, mostly text. With such large amounts of unstructured text becoming available both on the public internet and to enterprises internally, there is a significant need to analyze such data and to derive meaningful insight from it. Superior access to information is the key to superior performance in almost any field of endeavor. As a result, there exists a growing demand in the analysis of unstructured data on a timely basis to derive insights for the organization.

However, it is humanly impossible to analyze the vast amount of information that is arriving every second at an exponentially increasing rate. To our knowledge, there are no attempts at analyzing the meaning or impact of the text in a document on a topic of interest. Such a topic may be a company for example. As an example, a hedge fund manager is interested in analyzing what a document is saying about a company of interest. As another example, the treasurer of a corporation will be interested in what the contents of a document imply about the creditworthiness of a customer or borrower. In yet another example, a pharmaceutical company is interested in the impact of the content of a document on a drug's efficacy. It is also important to point out that any method or system to understand meaning should not preferably be a black box and must be capable of providing an audit trail to the user for how the impact was derived.

There are a number of statistical methods that are generally deployed to process unstructured text and they can be employed for the purpose of the meaning or impact of a document's contents on a concept. But such methods have major limitations in terms of being able to understand the real meaning of a document's contents. Firstly, a statistical model is developed from a set of training documents and afterwards, an unclassified document is classified into the one or more categories by applying the statistical model. There are a variety of statistical approaches available for the purpose ranging from naïve Bayes classifiers to support vector machines. All statistical methods irrespective of approach have several limitations. First, given the large scale nature of the problem, to develop a robust model, one needs a large homogeneous training set with respect to the problem being solved. Second, statistical models are black boxes and not tractable. Users will not have the ability to understand the precise reason behind the outcome. Third, statistical methods are largely frequency or word pattern based. Given the large number of ambiguous words in any word based language like English, statistical methods will not be able to interpret the fine grained context in a document. There is even a more complex form of such ambiguity which occurs in the form of phrases which are semantically equivalent in their usage in a document but cannot be determined to be so without some external input. Such systems are unable to decipher whether a particular word is used in a different context within the different sections of the same document. Similarly, these systems are limited in identifying scenarios where two different words (e.g., factory output or production from a unit) may have substantially identical meanings in the different sections of the document. The restriction to process the content of the document matching on the level of individual words can generate inaccuracies while interpreting the impact of the document's content. Therefore there exists a need for a system and a method for a context based, tractable interpretation of the meaning or impact of a document's content on a concept. The system and method should also be extendable to incorporate user provided additional context without any additional programming.

Various natural language processing methods exist to understand the local sentiment of the unstructured text. Generally, such methods use statistical tools and a set of sentiment lexicons to extract sentiments. For example, Hatzivassiloglou and McKeown in their publication titled 'Predicting the semantic orientation of adjectives' published in EACL '97 Proceedings of the eighth conference on European chapter of the Association for Computational Linguistics predict semantic orientation of adjectives by grouping the adjectives into two clusters such that maximum constraints are satisfied based on a hypothesis of how adjectives are separated. In another method Wiebe in the publication titled 'Learning Subjective Adjectives from Corpora' published in Proceedings of the 17th National Conference on Artificial Intelligence (AAAI-2000) analyzes adjectives for gradation and polarity and thereby, utilizes statistical factors to predict the gradability of adjectives. In another method, Kim and Hovy in their publication titled 'Determining the sentiment of opinions' published in Proceedings of the 20th International Conference on Computational Linguistics rely on WordNet to generate lists of words with positive and negative orientation based on seed lists. However, these methods lack the ability to understand the full context and the interrelationships of the entire text as it impacts a concept. They do not decompose the entire contents of the document in a linguistic sense to understand the contextual meaning or impact of the contents of the document on a concept.

Further, the various existing sentiment analysis methods fail to use prior knowledge of a domain pertaining to the unstructured text. Furthermore, none of these methods allow interpreting the meaning of the unstructured text in a contextually relevant manner. Additionally, these methods fail to provide accurate semantic analysis when the same unstructured text can carry a different sentiment for two different audiences. That is to say, these methods fail to interpret words that are positive in one domain and negative in another domain, and words that are relevant in one domain and non-relevant in another domain. Such constraints create inaccuracies in the sentiment analysis. Therefore, there exists a need for a system and method for accurately interpreting the unstructured text with reference to a specific concept in a tractable manner so the user can understand precisely how the engine interpreted the document's content and reached its conclusions.

SUMMARY

According to an aspect of the invention, disclosed is a method for determining an impact of a document on a specific concept of interest. The method: generating at least one cluster from a plurality of semantically similar clauses of the document; identifying a first concept from a plurality of concepts of the at least one cluster such that the first concept represents at least a portion of content disclosed in the at least one cluster; determining at least one category for the document using the first concept; computing an impact of a first clause of the at least one cluster with respect to the at least one category; and calculating the impact of the document in accordance with the computed impact of the first clause.

The method further includes computing the impact of the at least one cluster using an impact of at least two clauses or sentences of the at least one cluster. The impact computation includes computation of a rating score and a direction of the impact of the first clause with respect to the at least one category of the document.

The method also includes determining at least one semantic parameter within the first clause using at least one linguistic analysis rule; and computing the impact of the first clause of the at least one cluster with respect to the at least one category using the at least one semantic parameter. The at least one semantic parameter comprises at least one of: a representative concept of the document, an impact phrase, an intensity corresponding to the impact phrase, object, subject, time-period corresponding to the impact phrase and a location.

In an embodiment, a system for determining the impact of the document on the one or more categories is disclosed. The system comprising: a cluster generating module configured to generate at least one cluster from a plurality of semantically similar clauses of the document; a cluster concept identifier to identify a representative concept for the at least one cluster; and an impact analyzer comprising: a semantic parameter identifier configured to determine at least one semantic parameter for a first clause of the at least one cluster; at least one impact analysis rule comprising information to determine the impact of the first clause of the at least one cluster using the at least one semantic parameter; and an impact engine configured to compute the impact of the first clause of the at least one cluster using the representative concept and the at least one impact analysis rule.

Each component of the system is driven by a set of externalized rules and configurable parameters, generically referred to as the Configuration Module in the detailed description. This makes the system adaptable and extensible without any programming.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

For a more complete understanding of exemplary embodiments of the present invention, reference is now made to the following descriptions taken in connection with the accompanying drawings in which:

FIGS. 7A and 7B illustrate an exemplary embodiment of an outcome from one or more modules of the text processing layer of the language processing modules according to one or more embodiments of the invention;

FIGS. 9A and 9B illustrate an exemplary embodiment of a outcome from one or more modules of the natural language processing layer according to one or more embodiments of the invention;

FIGS. 11A, 11B and 11C illustrates an exemplary embodiment of an outcome from one or more modules of the linguistic analysis layer according to one or more embodiments of the invention;

FIG. 14 illustrates an exemplary document whose impact is to be determined on the one or more categories according to one or more embodiments of the invention;

FIGS. 15A and 15B illustrate an exemplary outcome when the document is decomposed into clusters, sentence and clauses according to one or more embodiments of the invention;

FIGS. 16A, 16B and 16C illustrate an exemplary table depicting values for one or more semantic parameters of a clause of the document and exemplary impact ratings of the clause or the sentence of the document according to one or more embodiments of the invention;

FIG. 17 illustrates an exemplary table listing one or more impact analysis rules according to one or more embodiments of the invention.

DETAILED DESCRIPTION OF THE DRAWINGS

The methods and systems described herein can determine an impact of a document on a specific concept of interest so as to enable users to understand sentiments disclosed in the document with respect to the concept of the interest. The specific concept of interest can be one or more categories within which the document can be classified. The one or more categories can be obtained from the representative concepts of the document or from the concepts as listed in ontology of a discourse unit.

The methods and systems described herein can be configured to determine one or more impact phrases that include a set of words communicating the desired impact of the document. In an embodiment, the impact phrases can be verbs, nouns, adjectives and adverbs. Further, the methods and systems described herein can be configured to determine one or more primary impact words and words that accentuate the impact. For example, adjectives and adverbs are generally used to accentuate impact within the document and the methods and systems described herein can be configured to determine these adjectives and adverbs. The methods and systems described herein can be configured to determine the impact of each of the impact phrases identified within the document on the specific concept of interest and subsequently, assimilate the impact from theses phrases to determine an overall impact of the document on the specific concept of the interest.

Further, the methods and systems described herein can be configured to determine one or more semantic parameters such as time, quantity and location corresponding to the impact phrases so as to determine quantum of the impact of the document on the specific concept of interest. For example, in a sentence, 'Housing starts rose significantly by 3% in January' of the document, the methods and systems described herein can determine 'rose' as a primary impact word, 'significantly' as a word that describes intensity of the impact, '3%' as a quantitative indicator of the intensity of the impact, and 'January' as an indicator of time. In addition, the methods and systems described herein can be configured to determine negation related impact phrases within the document. Such phrases can contain 'Negation' for example, "Housing starts did not rise in January". In addition, various directional reversal indicators can be determined using one or more phrases such as 'anti-immigration', 'unemployment' and the others.

The methods and systems described herein can be configured to normalize the impact assessment to a discrete set of outcomes and associated impact ratings. For example, a particular impact of the document on the specific concept of interest can be listed into any of one or more impact categories such as significantly positive, positive, neutral, negative and significantly negative depending on the quantum of the impact of the document on the specific concept of interest.

Figure 1:
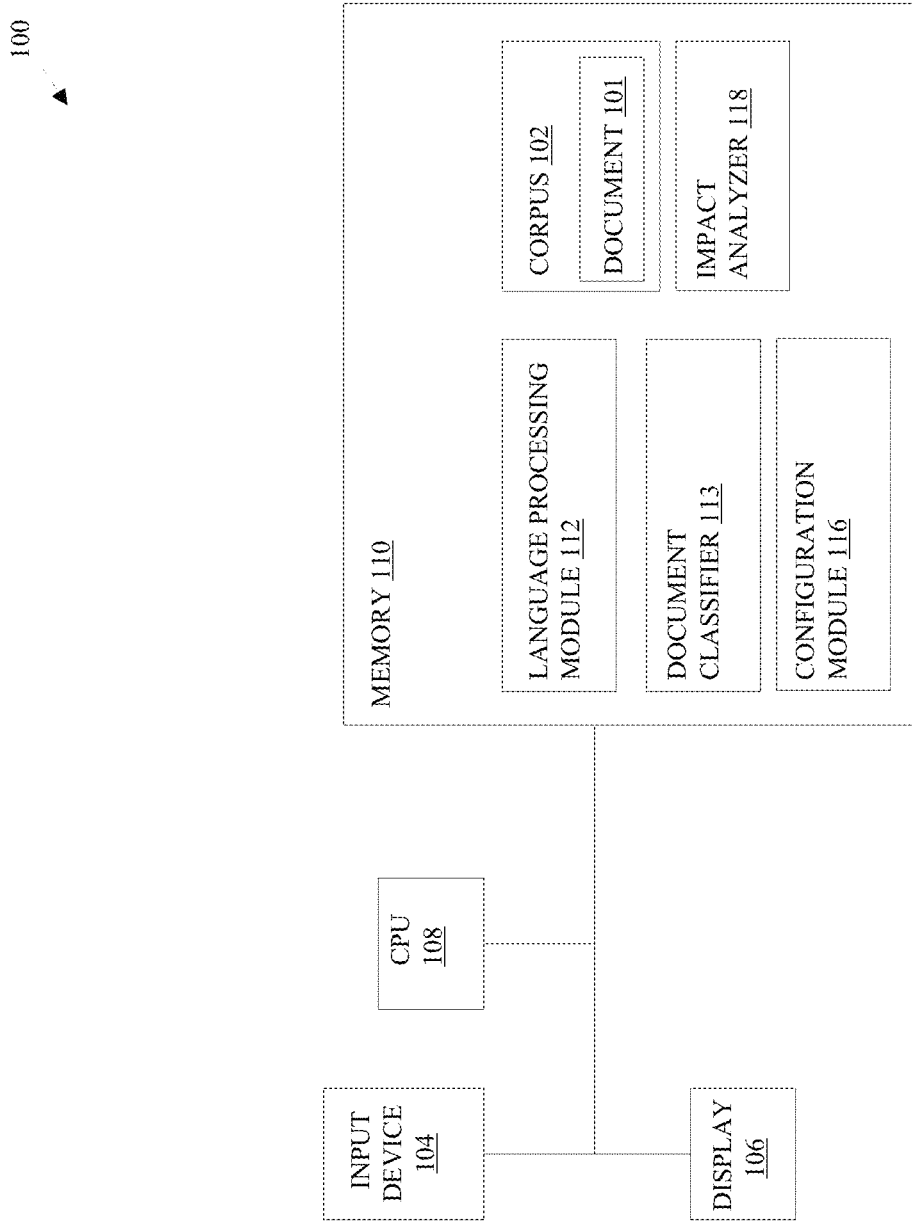
FIG. 1 illustrates an exemplary embodiment of a computing device configured to determine an impact of a document on a concept according to one or more embodiments of the invention.

Referring to FIG. 1, an exemplary embodiment of a computing device 100 configured to determine the impact of the document 101 according to one or more embodiments of the invention is disclosed. The document 101 can be retrieved from a corpus 102 or may be provided by a user as an input document. The computing device 100 can be configured to determine one or more categories for the document 101 for classification and subsequently, determine the impact of the document 101 for the classified categories of the document 101. For example, the document 101 titled "Tax incentives for local manufacturers of solar panels in US" can be categorized into US manufacturers and government regulations. Accordingly, the computing device 100 can be configured to determine the impact of the document 101 on the category titled "US manufacturers and government regulations".

In an embodiment, the computing device 100 can be configured to include an input device 104, a display 106, a central processing unit (CPU) 108 and memory 110 coupled to each other. The input device 104 can include a keyboard, a mouse, a touchpad, a trackball, a touch panel or any other form of the input device 104 through which the user can provide inputs to the computing device 100. The CPU 108 is preferably a commercially available, single chip microprocessor including such as a complex instruction set computer (CISC) chip, a reduced instruction set computer (RISC) and the like. The CPU 108 is coupled to the memory 110 by appropriate control and address busses, as is well known to those skilled in the art. The CPU 108 is further coupled to the input device 104 and the display 106 by bi-directional data bus to permit data transfers with peripheral devices.

The computing device 100 typically includes a variety of computer-readable media. By way of example, and not limitation, the computer-readable media can comprise Random Access Memory (RAM), Read Only Memory (ROM), Electronically Erasable Programmable Read Only Memory (EEPROM), flash memory other memory technologies; CDROM, digital versatile disks (DVDs) or other optical or holographic media; magnetic cassettes, magnetic tape, magnetic disk storage or other magnetic storage devices; or any other medium that can be used to encode desired information and be accessed by computing device 100.

The memory 110 includes non-transitory computer-storage media in the form of non-transitory volatile and/or nonvolatile memory. The memory 110 may be removable, non-removable, or a combination thereof. In an embodiment, the memory 110 includes the corpus 102, and one or more language processing modules 112 such as to process the corpus 102 to retrieve the document 101, a document classifier 113 configured to classify the document 101 and an impact analyzer 118 configured to analyze the impact of the document 101 on a specific concept of the interest. The corpus 102 can include text related information including tweets, facebook postings, emails, claims reports, resumes, operational notes, published documents or combination of any of these texts. In an embodiment, the text related information of the corpus 102 can be utilized to build the document 101 so that the document classifier 113 can be configured to classify the document 101 into the one or more categories and subsequently, the impact analyzer 118 can be configured to determine the impact of the document 101 on the one or more categories of the document 101. In an embodiment, the corpus 102 can include one or more documents of different domains. Subsequently, the user of the computing device 100 inputs a request comprising a request to classify a particular document from a particular domain. The particular document can be extracted from the corpus 102 and classified thereafter. After classification of the document 101 in to a specific category, the impact analyzer 118 can be configured to determine the impact of the document 101 on the specific category.

The one or more language processing modules 112 can be configured to process structured or unstructured text of the document 101 at a sentence level, clause level or at phrase level. The language processing modules 112 can further be configured to determine which noun-phrases refer to which other noun-phrases. Accordingly, one or more co-referential sentences or clauses can be determined. Based on the one or more co-referential sentences or clauses, clusters are generated at clause level or at sentence level. For example, a clause cluster can indicate presence of co-referential clauses of the document 101. Similarly, a sentence cluster can indicate presence of co-referential sentences of the document 101.

In an embodiment, the document classifier 113 can be configured to identify one or more concepts within each cluster of the document 101. For example, the document classifier 113 can be configured to identify the one or more concepts within each clause of the clause cluster or the sentence cluster of the document 101. Subsequently, the document classifier 113 can be configured to determine one or more representative concepts for each cluster of the document 101 such that the one or more representative concepts can represent the content of the respective cluster. Further, the document classifier 113 can be configured to determine one or more categories for the document 101 such that the one or more categories of the document 101 are derived from the one or more representative concepts of the clusters identified in the document 101. Accordingly, the document classifier 113 can be configured to classify the document 101 into the one or more categories.

The impact analyzer 118 can be configured to determine the impact of the document 101 on the one or more categories of the document 101 that are derived from the one or more representative concepts of the clusters identified in the document 101. Further, the impact analyzer 118 can be configured to determine the level of the impact of the document 101 on each of the one or more representative concepts of the document 101 from a specific context. For example, a particular document can indicate content related to a substantial increase in oil prices. The document classifier 113 can be configured to identify a representative concept such as oil prices for the particular document. Further, the impact analyzer 118 can be configured to determine the impact of the particular document from a context of oil companies and consumer related companies. As a result, the impact analyzer 118 determines a positive impact of the particular document for the oil companies and a negative impact of the particular document on the consumer related companies. In addition, the impact analyzer 118 can be configured to determine an impact score for the document 101 on the specific concept of interest.

In an embodiment, the memory 110 can be configured to include a configuration module 116 so as to enable the user to input one or more configuration related parameters to control the processing of the language processing modules 112 and the impact analysis of the document 101. In an embodiment, the user may input the parameters in a form of feedback. Accordingly, the computing device 100 can utilize this feedback so as to control the impact analysis of the document 101. For example, the user may indicate using the configuration module 116 a selection of impact analysis rules that can be used for determining the impact of the document 101 on a specific concept of interest. In an embodiment, the user can manage the impact analysis rules using the configuration module 116. For example, the user can update a particular impact analysis rule by modifying respective definition of the particular impact analysis rule. Further, the user can add or remove a specific impact analysis rule and respective definition of the specific impact analysis rule. Subsequently, the impact analyzer 118 can be configured to access the configuration module 116 so as to analyze the impact of the document 101 using the user selected rules. The methods and systems described herein discloses a model based approach wherein the configuration module 116 can be used to control the impact analysis of the document 101 and is further described in detail in FIG. 5 of this disclosure.

Figure 2:
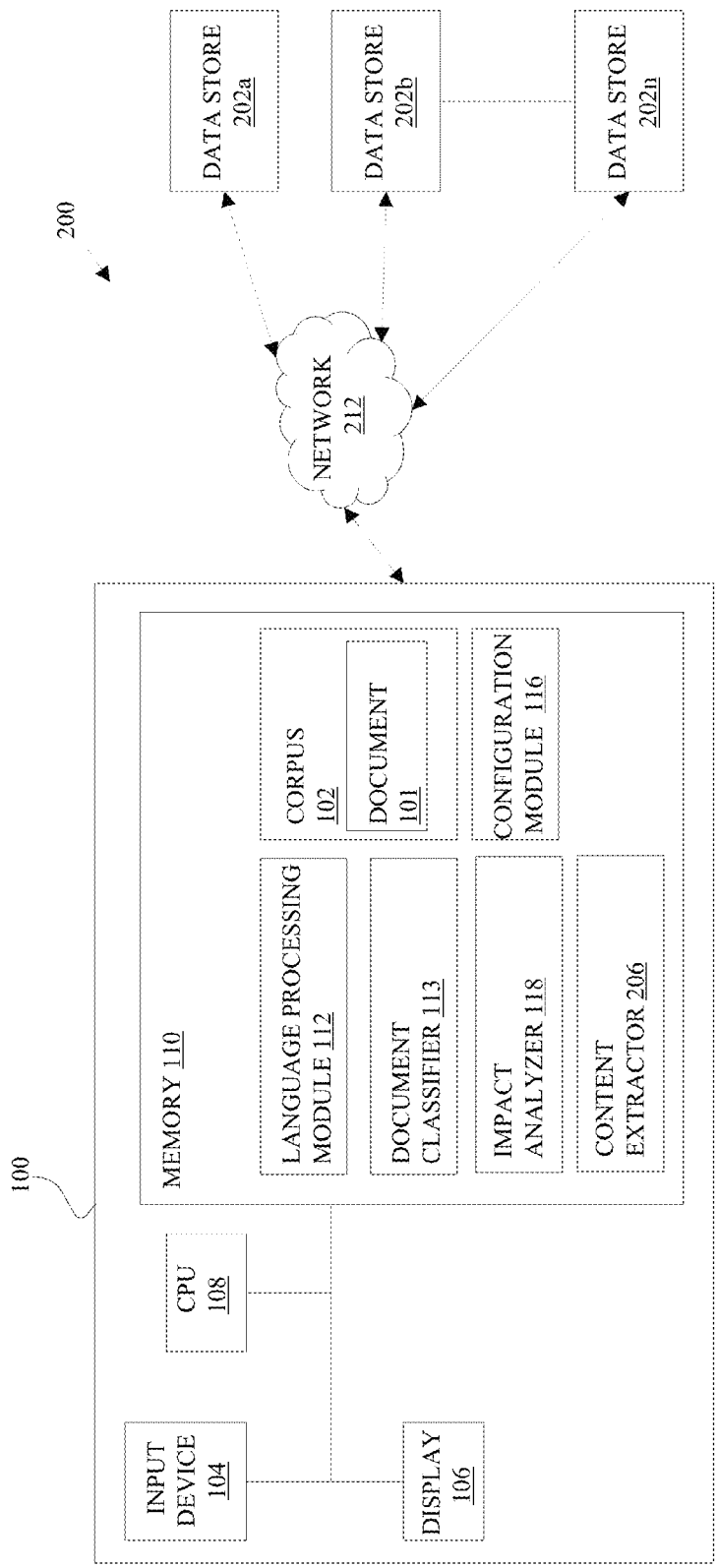
FIG. 2 illustrates an exemplary embodiment of a computing environment for determining the impact of the document extracted from a corpus according to one or more embodiments of the invention.

FIG. 2 illustrates an exemplary embodiment of a computing environment 200 for determining the impact of the 101 that is extracted from the corpus 102 according to one or more embodiments of the invention. The computing device 100 can be configured to communicatively couple to a plurality of data stores such as a data store 202a, data store 202b and a data store 202n (collectively referred herein to as the data store 202) through a network 212. The network 212 can be a wire-line network or wireless network configured to enable the computing device 100 to communicate with the data store 202 so as to extract content stored therein. In an example, the memory 110 can be configured to include a content extractor 206 to identify content that is required to be extracted from the data store 202.

In an embodiment, the user of the computing device 100 can input a specific request including a request to identify documents corresponding to a specific domain (e.g., oil industry). The request may further include one or more search terms for which a search may be carried out within the data store 202 to identify the documents related to the one or more search terms. Accordingly, the content extractor 206 can be configured to extract documents from the data store 202 corresponding to the specific request of the user. For example, the content extractor 206 can extract various documents, manuals or any other textual information corresponding to one or more search terms. Each of the extracted documents is processed using the language processing modules language processing modules 112 to identify clusters within the extracted document. Subsequently, the document classifier 113 can be configured to classify the extracted document into the one or more categories and the impact analyzer 118 can be configured to determine the impact of the extracted document on the one or more categories of the document 101.

Figure 3:
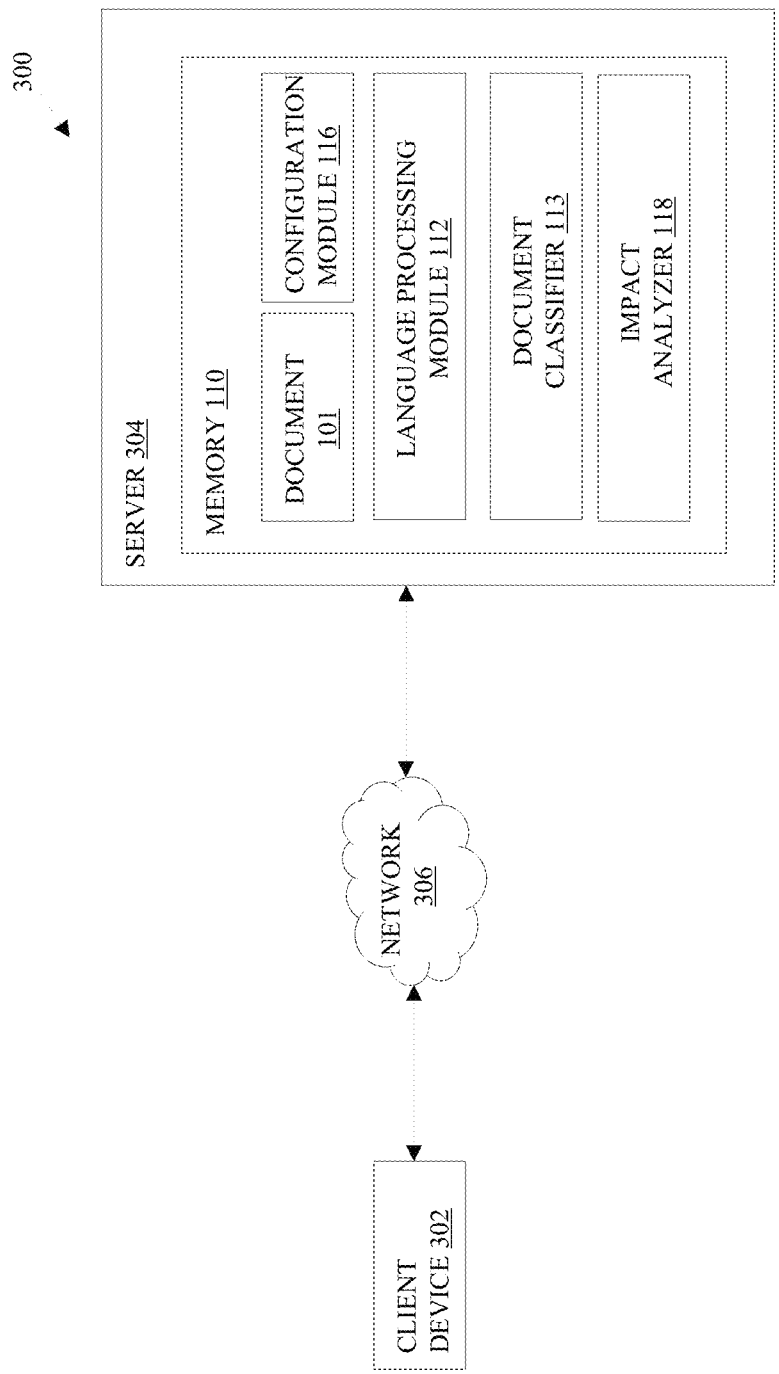
FIG. 3 illustrates an exemplary embodiment of a client server computing environment for determining the impact of the document according to one or more embodiments of the invention.
Figure 4:
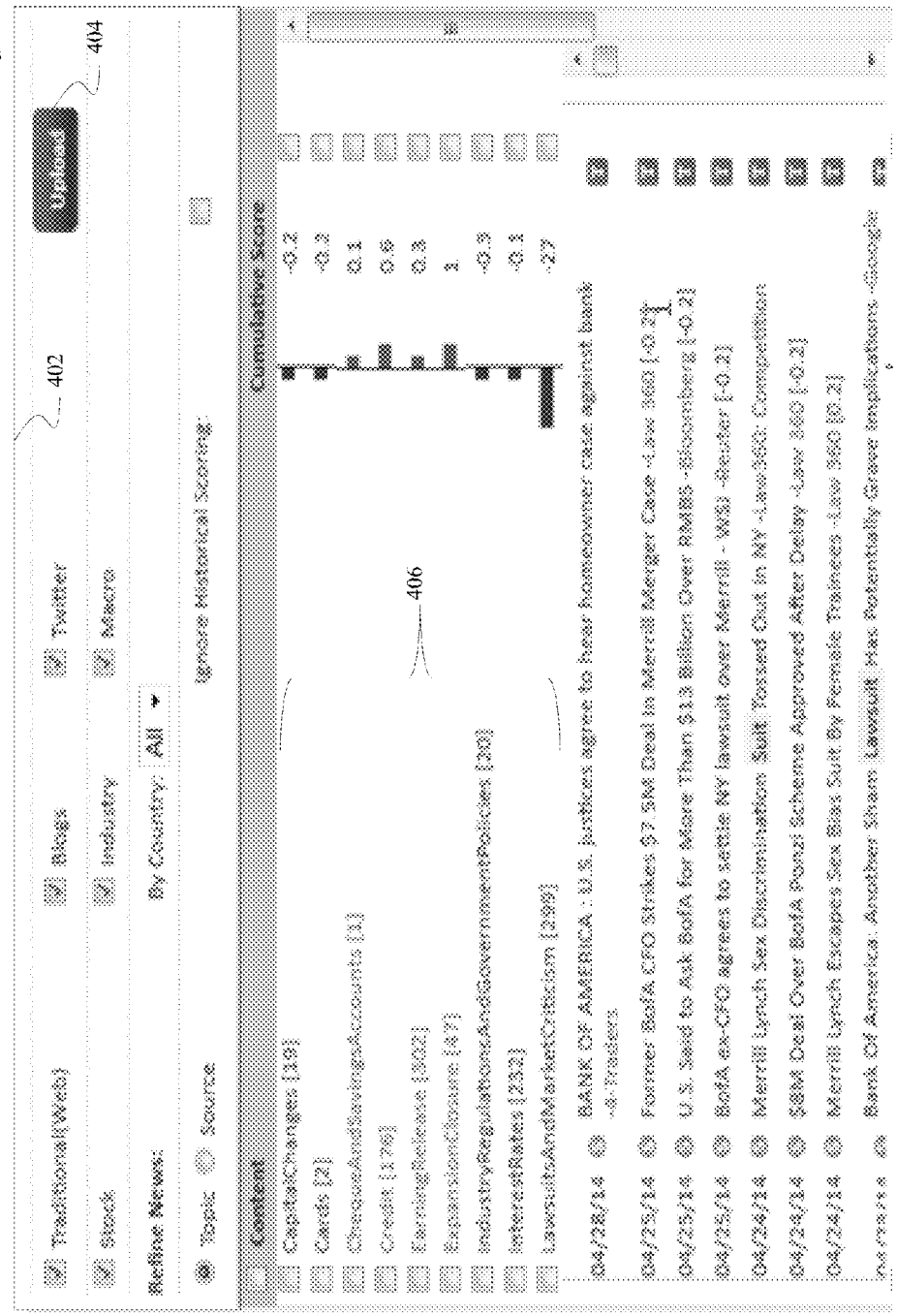
FIG. 4 illustrates an exemplary embodiment of a display interface depicting the impact analysis of the document on the one or more concepts according to one or more embodiments of the invention.

FIG. 3 illustrates an exemplary embodiment of a client server computing environment 300 for determining the impact of the document 101 according to one or more embodiments of the invention. The client server computing environment 300 includes a client device 302 configured to access a server 304 through a network 306. The client device 302 enables the user to input the specific document which requires to be classified. The client device 302 can include a personal computer, laptop computer, handheld computer, personal digital assistant (PDA), mobile telephone, or any other computing terminal that enable the user to transmit the request to classify the document 101 to the server 304. On receiving the request, the server 304 can be configured to process the document 101 using the language processing modules 112 and execute the document classifier 113 to classify the document 101 in to one or more categories. After the determination of the one or more categories for the document 101, the impact analyzer 118 can analyze the impact of the document 101 on the one or more categories. The impact analyzer 118 may further determine the level of the impact that document 101 can create on the one or more categories. Subsequently, the determined level of the impact of the document 101 can be transmitted back to the client device 302. Consequently, the client device 302 may display the results of the impact analyzer 118 (i.e., the impact levels) to the user in a manner as illustrated in FIG. 4 of this disclosure. Further, the client device 302 can communicate feedback from the user to the server 304 in the configuration module 116 such that the server 304 can be configured to control the impact determination of the document 101 using the configuration module 116.

FIG. 4 illustrates an exemplary embodiment of a display interface 400 for depicting the impact of the one or more documents on the specific concept according to one or more embodiments of the invention. The display interface 400 includes a section 402 through which the user can enter input related to the selection of the one or more documents. For example, the user selects various sources such as web articles, blogs, tweets, stock related updates, industry related news, and other text related information such as to determine the impact of information retrieved from these sources on the specific concept of interest. Additionally, the user can upload the document using an upload selection button 404.

After the selection of the sources for the document, the document classifier 113 can be configured to categorize the selected documents into one or more categories. For example, for a company Bank of America, one or more documents are extracted from the sources selected by the user and classified thereafter. As illustrated, the document classifier 113 classifies the various documents classified into the one or more categories in a section 406 of the display interface 400. For example, the exemplary categories such as capital changes, cards, checking and saving accounts, credit, earning release, expansion closure, industry regulations and government policies, interest rates, law suits and market criticism includes 19, 2, 1, 176, 302, 47, 20, 232, and 299 documents respectively. Further, the impact analyzer 118 can be configured to determine the impact of the classified documents on the respective categories. For example, the impact analyzer 118 determines an impact score and the direction of the impact for each of the document classified in these categories. As illustrated, a document titled, "Former Bofa CFO strikes $7.5 M deal in Merrill merger case" created a negative impact with a score of −0.2 on the lawsuits and market criticism category for Bank of America. Similarly, another document titled, "Merrill Lynch escapes sex bias suit by female trainees" created a positive impact with an impact score of +0.2 on the lawsuits and market criticism category for Bank of America. Furthermore, the impact analyzer 118 can be configured to consolidate the impact of the classified documents on the specific category. For example, the documents classified within the credits category created a positive impact with a score of +0.6 on this category, whereas the documents classified within the lawsuits and market criticism category created a highly negative impact with a score of −27 on this category. The methods and systems described herein employ one or more various processing techniques for deriving the score and direction of the impact on a specific category. These techniques are described in detail in further sections of the description.

Figure 5:
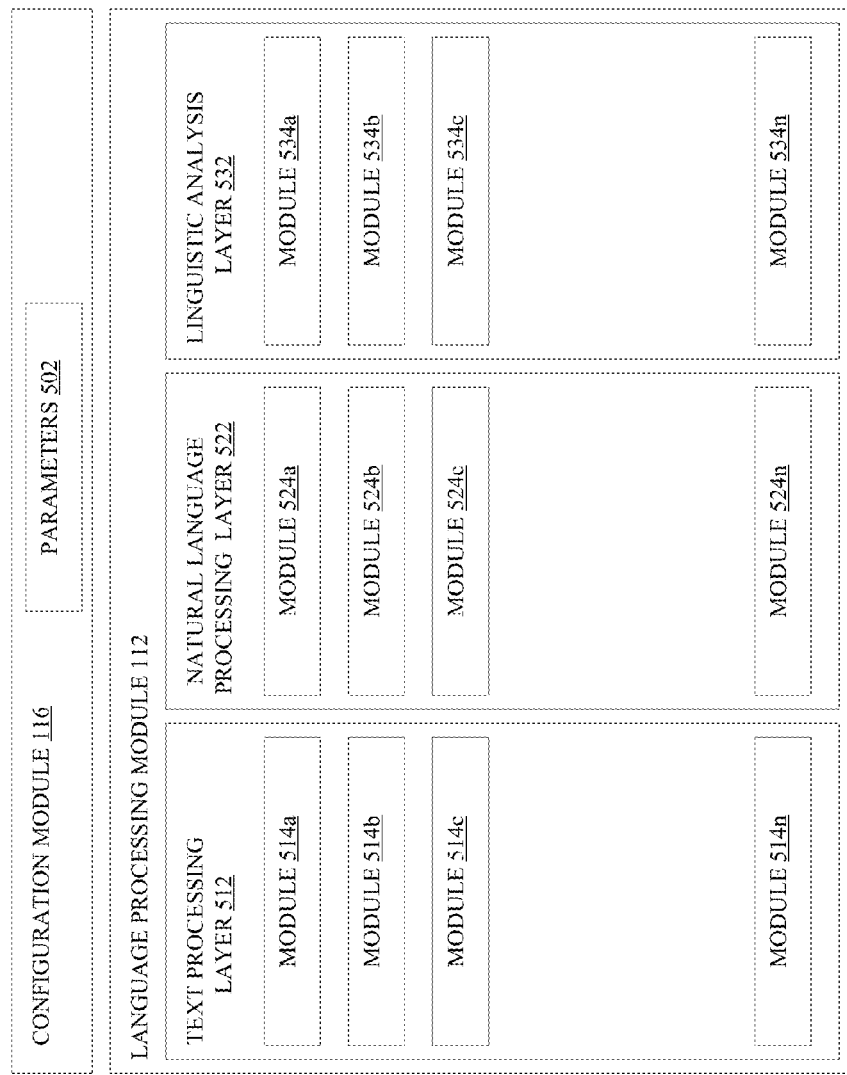
FIG. 5 illustrates an exemplary embodiment of a functional block diagram for controlling the execution of language processing modules according to one or more embodiments of the invention.

FIG. 5 illustrates an exemplary embodiment of a block diagram 500 depicting the processing of the document 101 in the corpus 102 using the language processing modules 112 according to one or more embodiments of the invention. As shown, parameters 502 of the configuration module 116 can be accessed to control the execution of the language processing modules 112. In an embodiment, the language processing modules 112 can be configured to include one or more processing layers such as a text processing layer 512, a natural language processing layer 522 and a linguistic analysis layer 532. The text processing layer 512 can be configured to include one or more modules such as a module 514a, a module 514b, a module 514c and a module 514n such as to execute text level processing of the document 101 identified in the corpus 102. The natural language processing layer 522 can be configured to include one or more modules such as a module 524a, a module 524b, a module 524c and a module 524n so as to derive meaning from the natural language as depicted in the processed text of the document 101. The linguistic analysis layer 532 can be configured to include one or more modules such as a module 534a, a module 534b, a module 534c and a module 534n such as to determine clusters within the document 101.

In an embodiment, the one or more modules of the various layers can be configured to include one or more respective rules for performing one or more operations on the text in the document 101. For example, the module 514 includes respective rules that are used to perform text related processing in the text processing layer 512. Similarly, the module 534 includes respective rules that are used to determine one or more clusters in the document 101. The methods and systems described herein allow the user to manage the rules corresponding to the respective modules using the configuration module 116. In an embodiment, the user can modify such rules via parameters 502 of the configuration module 116. For example, the user can add or remove any rules for the respective modules via the parameters 502 of the configuration module configuration module 116. As a result, the methods and systems described herein enable the user to control the execution of the language processing modules 112 and thereby provide flexibility of incorporation of feedback from the user.

Figure 6:
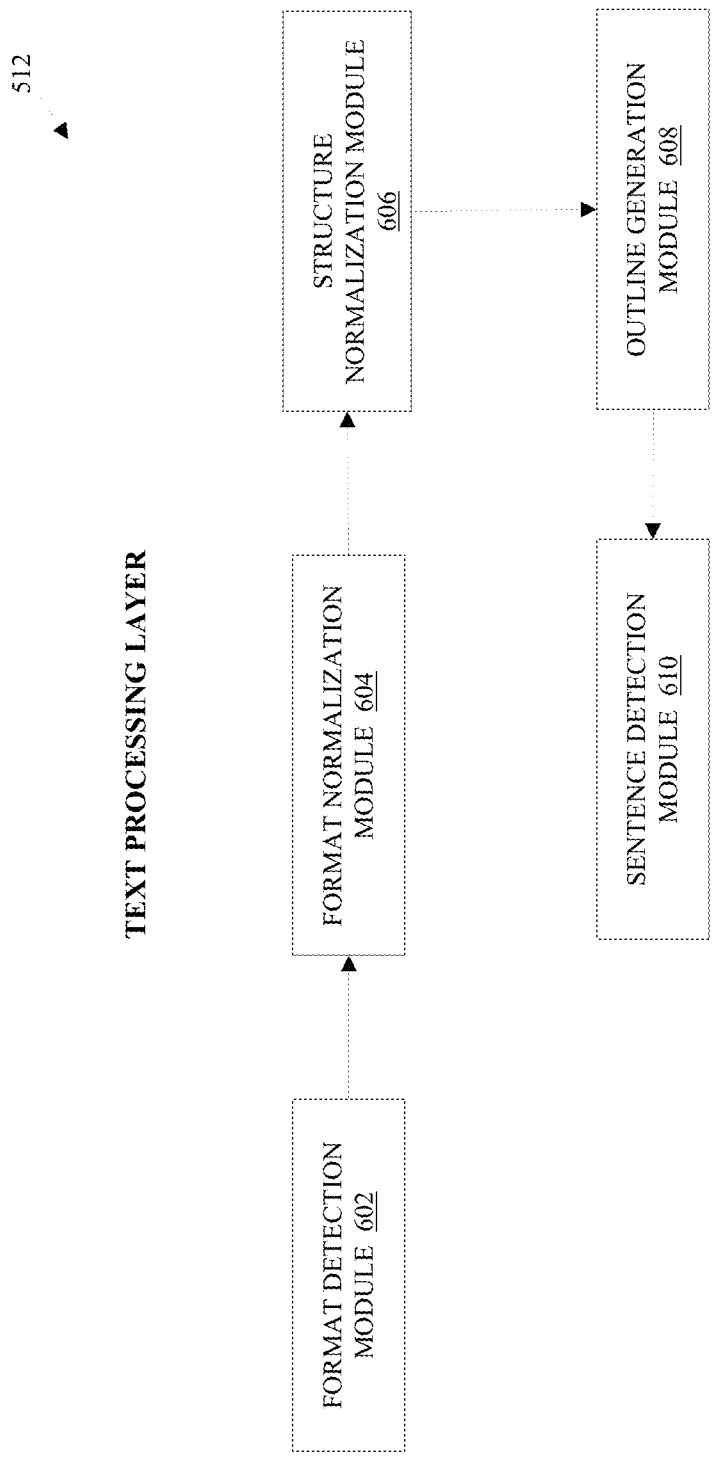
FIG. 6 illustrates an exemplary embodiment of a block diagram for a text processing layer of the language processing modules according to one or more embodiments of the invention.

FIG. 6 illustrates an exemplary embodiment of a block diagram for the text processing layer 512 according to one or more embodiments of the invention. The text processing layer 512 can be configured to include one or more modules such as a format detection module 602, a format normalization module 604, a structure normalization module 606, an outline generation module 608 and a sentence detection module 610. In one embodiment, the format detection module 602 can be configured to identify the format of the document 101. In one embodiment, the document 101 can be accessed from one or more sources such as the corpus 102 or the data store 202. In an example, the document 101 can be accessed based on the input from the user or through a batch processing system. Alternatively, the user can input the document 101. In one embodiment, the format detection module 602 can be configured to detect the format of the document 101 using format detection techniques employing one or more algorithms such as byte listening algorithm, source-format mapping algorithm or other algorithms.

Subsequently, the format detection module 602 detects the format of the document 101. The detected format can include one or more image or textual formats such as HTML, XML, XLSX, DOCX, TXT, JPEG, TIFF, or other document 101 formats. Further, the format normalization module 604 can be configured to process the document 101 into a normalized format. In addition, the format normalization module 604 can be configured to implement one or more text recognition techniques such as an optical recognition technique (OCR) to detect text within the document 101 when the format of the document 101 is an image format or one or more images are embedded within the document 101. In one embodiment, the normalized format of the document 101 can include a format including but not limited to a portable document format, an open office xml format, html format and text format.

In one embodiment, the structure normalization module 606 can be configured to convert the data in the document 101 into a list of paragraphs and other properties (e.g., visual properties such as font-style, physical location on the page, font-size, centered or not, and the like) of the document 101. Subsequently, the outline generation module 608 can be configured to process the one or more paragraphs of the document 101. For example, the outline generation module 608 can be configured to convert the one or more paragraphs using one or more heuristic rules into a hierarchical representation (e.g., sections, sub-sections, tables, graphics, and the like) of the document 101. In addition, the outline generation module 608 can be configured to remove the header and footer within the document 101 so as to generate a natural outline for the given document 101.

Subsequently, the sentence detection module 610 can be configured to perform sentence boundary disambiguation techniques so as to detect sentences within the each textual paragraph of the document 101. In addition, the sentence detection module 610 can be configured to handle detection of parallel sentences where a sentence is continued in several lists and sub-lists.

In an embodiment, the user can alter such rules for varying the output from the modules of the text processing layer 512 using the parameters 502 of the configuration module parameters 116. For example, the user can specify a domain such as a legal domain using the parameters 502 and accordingly, the outline generation module 608 can be configured to utilize rules associated with the legal domain for generating the hierarchical representation of the document 101. Further, the user can provide input using the parameters 502 such as to handle OCR errors using the outline generation module 608. In another example, the user can modify the rules for the sentence detection module 610 so as to add or delete rules for detecting sentences within the paragraph of the document 101. In another example, the user can utilize the parameters 502 so as to modify sentence detection based rules. In another embodiment, the user can enable or disable the execution of any of the modules of the text processing layer 512.

Referring to FIG. 7A, an exemplary unstructured document 101 is accessed for processing according to one or more embodiments of the invention. The unstructured document 101 can be extracted from the corpus 102 or from the external data store 202. In an embodiment, the text processing layer 512 can be configured to execute the aforementioned modules on the document 101 so as to extract text related information from the unstructured document 101. As illustrated, the various modules of the text processing layer 512 extract the textual information from the unstructured document. In addition, the sentence detection module 610 can be configured to detect one or more sentences within the extracted text of the unstructured document 101. As illustrated in FIG. 7B, the sentence detection module 610 extracts ten different sentences from the unstructured document 101. Each sentence of the unstructured document 101 is labeled as S0-S10.

Figure 8:
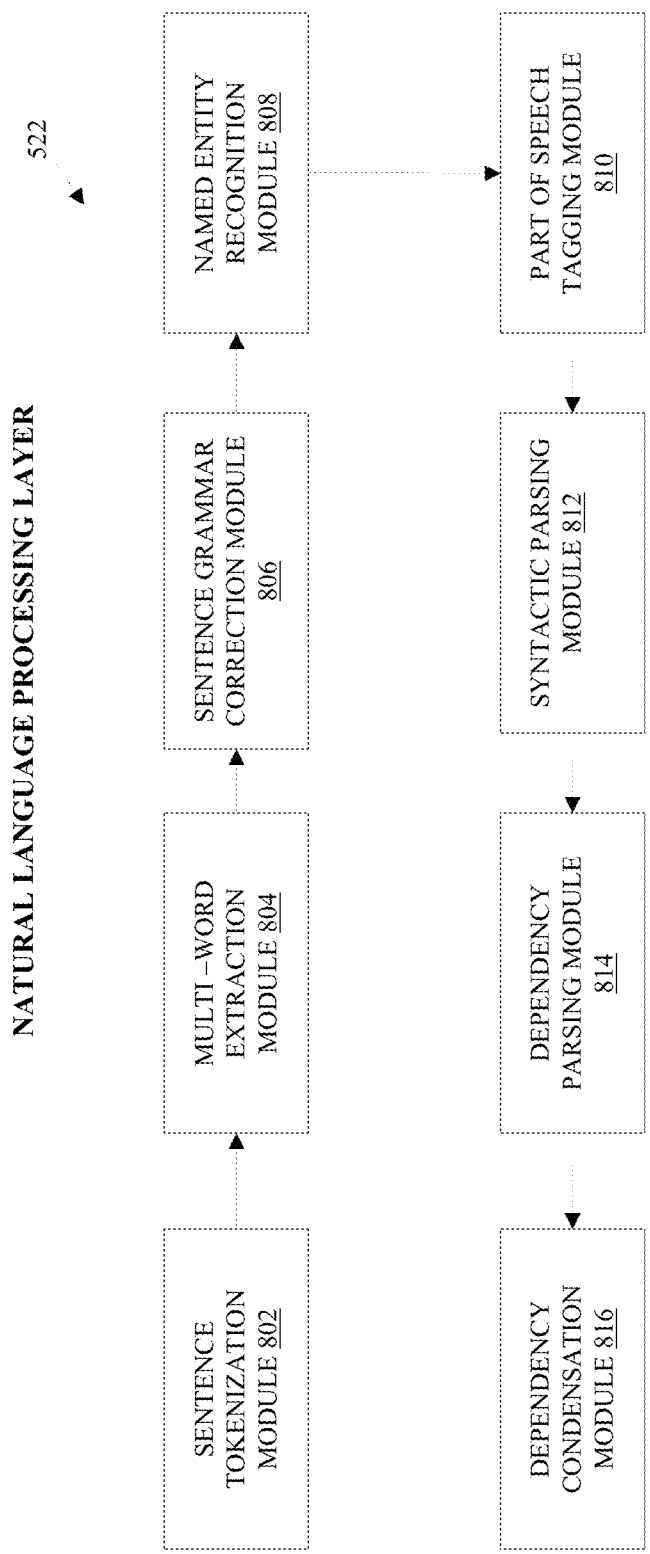
FIG. 8 illustrates an exemplary embodiment of a block diagram for a natural language processing layer of the language processing modules according to one or more embodiments of the invention.

FIG. 8 illustrates an exemplary embodiment of a block diagram for the natural language processing layer 522 according to one or more embodiments of the invention. In one embodiment, the natural language processing layer 522 includes various modules that are configured to determine syntax related processing of the sentences (e.g., S0-S10 of FIG. 7). In one embodiment, the natural language processing layer 522 can be configured to include a sentence tokenization module 802, a multi-word extraction module 804, a sentence grammar correction module 806, a named-entity recognition module 808, a part-of-speech tagging module 810, a syntactic parsing module 812, a dependency parsing module 814, and a dependency condensation module 816.

The sentence tokenization module 802 can be configured to segment the sentences into words. Specifically, the sentence tokenization module 802 identifies individual words and assigns a token to each word of the sentence. The sentence tokenization module 802 can further include expanding contractions, correcting common misspellings and removing hyphens that are merely included to split a word at the end of a line. In an embodiment, not only words are considered as tokens, but also numbers, punctuation marks, parentheses and quotation marks. The sentence tokenization module 802 can be configured to execute a tokenization algorithm, which can be augmented with a dictionary-lookup algorithm for performing word tokenization. For example, the sentence tokenization module 802 can be configured to tokenize a sentence as indicated in block 902 of FIG. 9A. Accordingly, an output of the sentence tokenization module 802 for the sentence in the block 902 is illustrated in a block 904. The block 904 depicts each word is segmented using a punctuation (,) for assigning a token.

The multi-word extraction module 804 performs multi-word matching. In an embodiment, for all words that are not articles, such as "the" or "a", consecutive words may be matched against a dictionary to learn if any matches can be found. If a match is found, the tokens for each of the words can be replaced by a token for the multiple words. In an example, the multi-word extraction module 804 can be configured to execute a multi-word extraction algorithm that can be augmented with a dictionary-lookup algorithm for performing multi-word matching. This is useful but not a necessary step and if the domain of the document 101 from which the sentences are extracted is known, this step can help in better interpretation of certain domain-specific application. For example, if the sentence of the block 902 is subjected to the multi-word extraction module 804, the words like 'manufacturing output' and 'production' may be identified as matched words and can be assigned a token for the multiple words.

The sentence grammar correction module 806 can be configured to perform text editing function to provide complete predicate structures of sentences that contain subject and object relationships. The sentence grammar correction module 806 is configured to perform the correction of words, phrase or even sentences which are correctly spelled but misused in the context of grammar. In an example, the sentence grammar correction module 806 can be configured to execute a grammar correction algorithm to perform text editing functions. The grammar correction algorithm can be configured to perform at least one of punctuation, verb inflection, single/plural, article and preposition related correction functionalities. For example, if the sentence of the block 902 is subjected to the sentence grammar correction module sentence grammar correction module 806, the sentence 902 may not undergo any changes as the said sentence 902 does not include any grammatical error. However, the sentence grammar correction module 806 can correct any grammatically incorrect sentence subjected thereto.

The named-entity recognition module 808 can be configured to generate named entity classes based on occurrences of named entities in the sentences. For example, the named-entity recognition module 808 can be configured to identify and annotate named entities, such as names of persons, locations, or organizations. The named-entity recognition module 808 can label such named entities by entity type (for example, person, location, time-period or organization) based on the context in which the named entity appears. For example, the named-entity recognition module 808 can be configured to execute a named-entity recognition algorithm, which can be augmented with a dictionary-based named entity lists. This is useful but not a necessary step and if the domain of the document 101 (from which the sentences are extracted) is known, this step can help in better interpretation of certain domain-specific applications. In an example, if the sentence of the block 902 is subjected to the named-entity recognition module 808, the terms like U.S. and January or 4½ years or this year can be classified in the classes such as location and time period respectively. The output is illustrated in a block 906 of FIG. 9A.

The part-of-speech tagging module 810 can be configured to assign a part-of-speech tag or label to each word in a sequence of words. Since many words can have multiple parts of speech, the part-of-speech tagging module 810 must be able to determine the part of speech of a word based on the context of the word in the text. The part-of-speech tagging module 810 can be configured to include a part-of-speech disambiguation algorithm. An output as illustrated in block 908 can be obtained when the sentence in the block 902 is subjected to the part-of-speech tagging module 810. The output in the block 908 indicates the part-of-speech tags associated with every word of the sentence of the block 902. For example, both 'U.S.' and 'January' are tagged as NNP (Proper Noun, singular), 'fell', 'disrupted' and 'got' are tagged as VBD (Verb, past tense), 'manufacturing', 'output', 'drop', 'weather', 'production', 'economy', 'start' and 'year' are tagged as NN (Noun, Singular) and so on.

The syntactic parsing module 812 can be configured to analyze the sentences into its constituents, resulting in a parse tree showing their syntactic relationship to each other, which may also contain semantic and other information. The syntactic parsing module 812 may include a syntactic parser configured to perform parsing of the sentences. In an example, if the sentence of the block 902 is subjected to the syntactic parsing module 812, the sentence of the block 902 can be parsed to show the syntactic relationship as shown in a block 922 of FIG. 9B.

The dependency parsing module 814 can be configured to uniformly present sentence relationships as a typed dependency representation. The typed dependencies representation is designed to provide a simple description of the grammatical relationships in a sentence. In an embodiment, every sentence's parse-tree is subjected to dependency parsing. A block 924 of FIG. 9B illustrates an exemplary embodiment of an output of the dependency parsing module 814 when the parse tree of the sentence of block 902 is subjected to the dependency parsing module 814.

In one embodiment, the dependency condensation module 816 can be configured to condense the dependency tree (e.g., the block 924 of the FIG. 9B) so as to club phrases and attributes together. In an example, the dependency tree includes dependencies amongst the tokens of the sentence and the condensed dependency tree (the includes dependencies between phrases (e.g., noun phrases, verb phrases, prepositional phrases and the like) after removing some tokens that exhibit other semantics with the phrases (e.g., attributes such as time-period, quantity, location, and the like). The condensed dependency tree aids in identifying relationship between the phrases.

In an embodiment, the methods and systems described herein enable the user to control the processing of the various modules of the natural language processing layer 522 using the parameters 502 of the configuration module 116. For example, the user can input in the form of the parameters 502 a domain for the processing of the modules of the natural language processing layer 522. A legal domain input can restrict the processing of the modules in accordance with rules defined for the legal domain. The user can input multi-word extraction list so as to configure the multi-word extraction module 804 to extract the multi-words using the extraction list as input by the user. Similarly, the user can input list of named entities so as to configure the named entity recognition module 808 to consider the user input while identifying and annotating the named entities.

Figure 10:
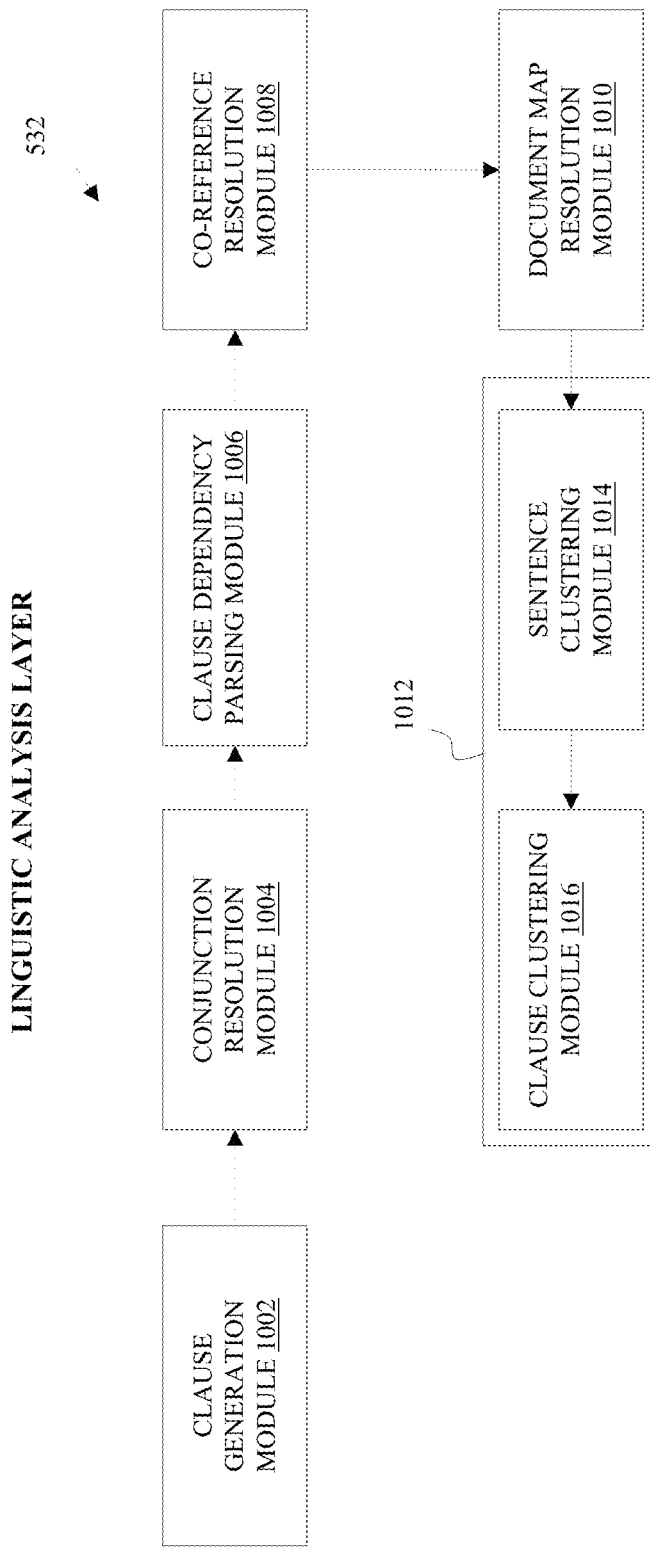
FIG. 10 illustrates an exemplary embodiment of a block diagram for a linguistic analysis layer of the language processing modules according to one or more embodiments of the invention.

FIG. 10 illustrates an exemplary embodiment of a block diagram for the linguistic analysis layer 532 according to one or more embodiments of the invention. The linguistic analysis layer 532 can be configured to include various modules that are configured to identify clauses and phrases or concepts in the sentences and the correlation therebetween. In one embodiment, the linguistic analysis layer 532 includes a clause generation module 1002, a conjunction resolution module 1004, a clause dependency parsing module 1006, a co-reference resolution module 1008, a document map resolution module 1010, a clustering module 1012 including a sentence clustering module 1014 and a clause clustering module 1016, and a representative concepts identification module 1018.

Figure 9A:
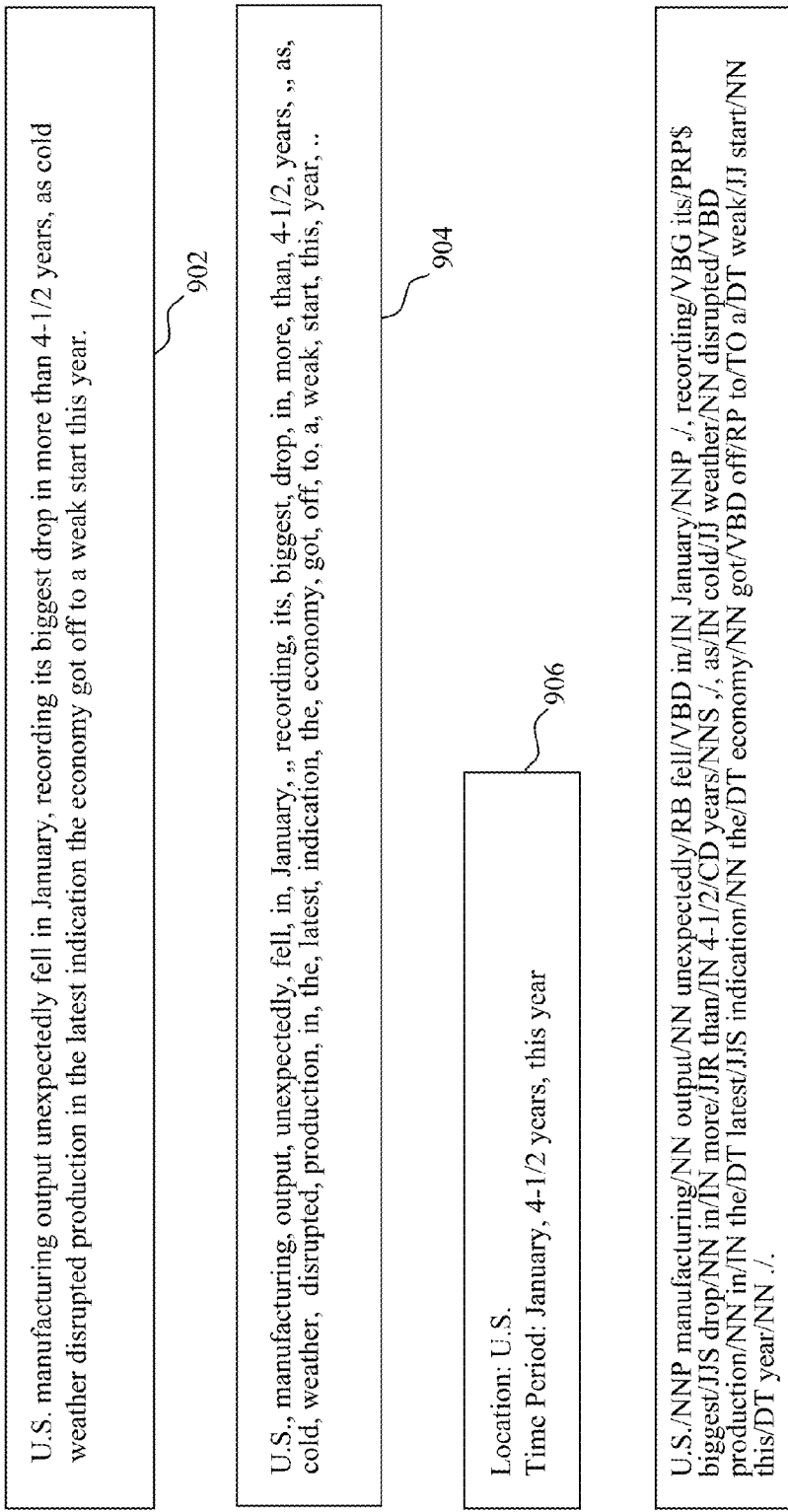
Figure 9B:
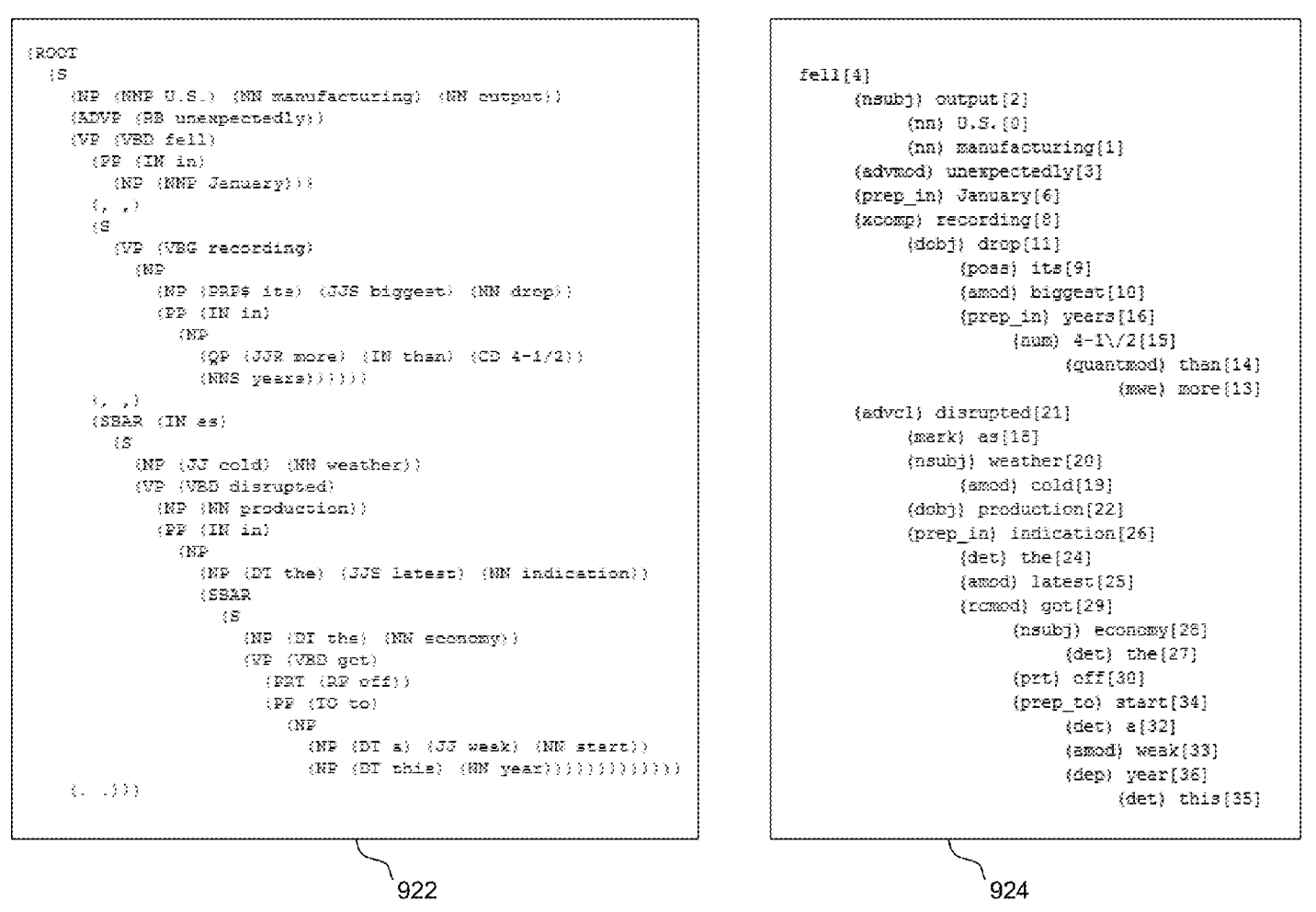
Figure 11A:
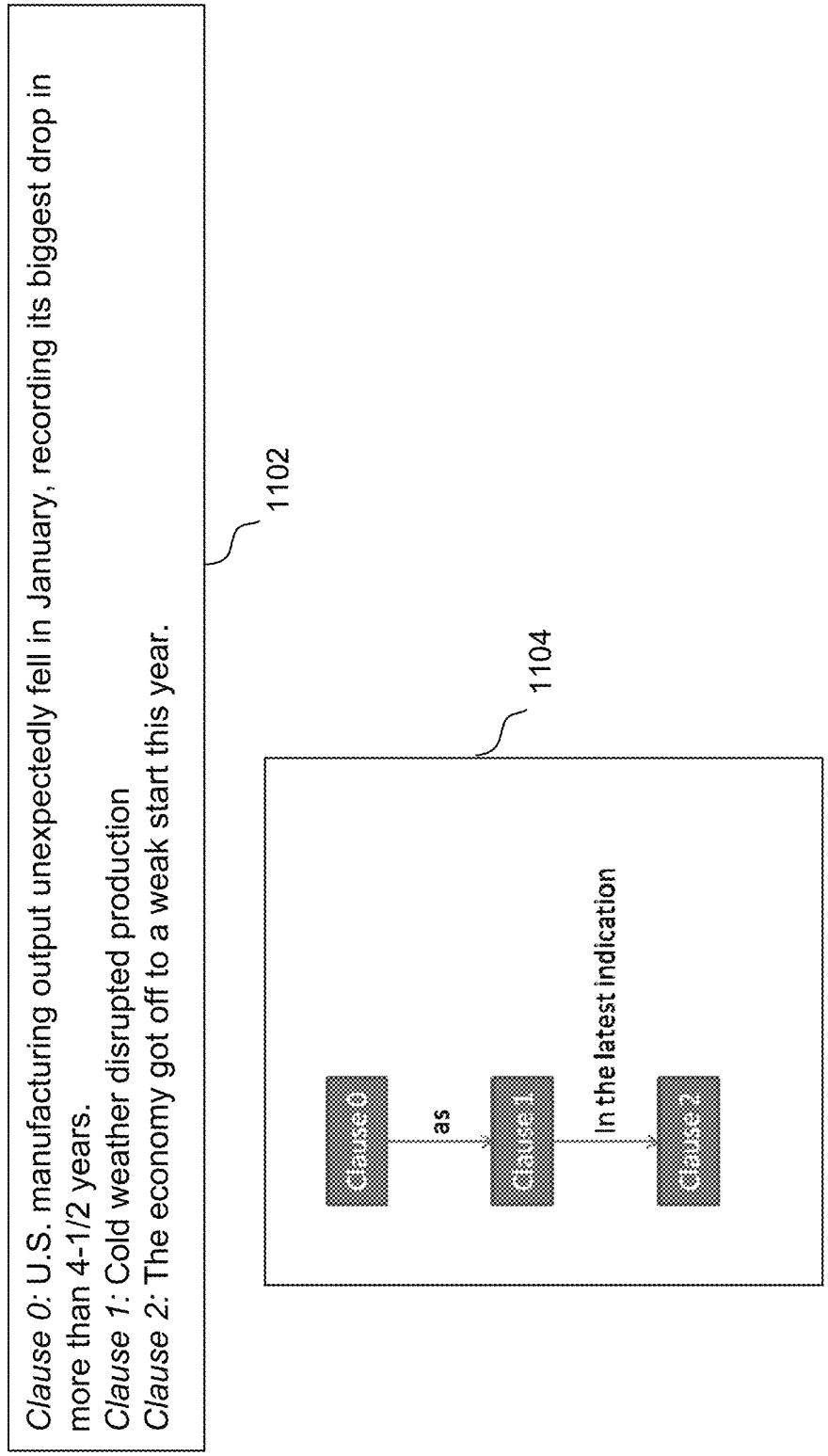

The clause generation module 1002 can be configured to generate meaningful clauses form the sentences. For example, a complex sentence can include various meaningful clauses, and the task of the clause generation module 1002 is to break a sentence into several clauses such that each linguistic clause is an independent unit of information. The clause can also be referred to as a single discourse unit (SDU), which is the independent unit of information. The clause generation module 1002 includes a clause detection algorithm, configured to execute clause boundary detection rules and clause generation rules, for generating the clauses from the sentences. In an example, if the sentence 902 (as shown in FIG. 9A) is subjected to the clause generation module 1002, the sentence of the block 902 is segregated into several clauses, which is depicted in a block 1102 in FIG. 11A. The block 1102 depicts that the sentence of the block 902 is segregated into three clauses, i.e., Clause 0, Clause 1 and Clause 2.

The conjunction resolution module 1004 can be configured to separate sentences with conjunctions into its constituent concepts. For example, if the sentence is "Elephants are found in Asia and Africa", the conjunction resolution module 1004 split the sentence into two different sub-sentences. The first sub-sentence is "Elephants are found in Asia" and the second sub-sentence is "Elephants are found in Africa". The conjunction resolution module 1004 can process complex concepts so as to aid normalization.

The clause dependency parsing module 1006 can be configured to parse clauses to generate a clause dependency tree. In an embodiment, the clause dependency parsing module 1006 can be configured to include a dependency parser that is configured to perform the dependency parsing to generate the clause dependency tree. The clause dependency tree can indicate the dependency relationship between the several clauses. In an example, if the sentence of the block 902 is subjected to the clause dependency parsing module 1006, a clause dependency tree can be generated for the various clauses (i.e., Clause 0, Clause 1 and Clause 2) so as to determine dependency relations. An exemplary embodiment of a clause dependency tree is in a block 1104 of FIG. 11A.

The co-reference resolution module 1008 can be configured to identify co-reference relationship between noun phrases of the several clauses. The co-reference resolution module 1008 finds out which noun-phrases refer to which other noun-phrases in the several clauses. The co-reference resolution module 1008 can be configured to include a co-reference resolution algorithm configured to execute co-reference detection rules and/or semantic equivalence rules for finding co-reference between the noun phrases. In an embodiment, the co-reference resolution module 1008 can be configured to implement one or more feature functions so as to identify semantic similarities between the noun phrases of the several clauses or sentences of the document 101. For example, assuming F as a set of feature functions, the co-reference resolution module 1008 can be configured to consider two noun phrases as arguments $X_i$ and $X_j$ of the respective sentences of the document 101. The argument $X_i$ indicates a noun phrase at an index i and the argument $X_j$ indicates a noun phrase at an index j of a sentence or clause of the document 101. Depending on the values of the indexes i and j, a binary valued function such as a binary anaphoric function or a binary cataphoric function can be executed. For example, if the index i is greater than the index j, the binary cataphoric function is executed otherwise, the binary anaphoric function is executed.

The binary valued function generates two binary outputs namely as true and a false. For example, a true output from the binary anaphoric function indicates that the noun phrase at the index i is an anaphora of the noun phrase at the index j. Further, a false output from the binary anaphoric function indicates that the noun phrase at the index i is not an anaphora of the noun phrase at the index j. Similarly, a true output from the binary cataphoric function indicates that the noun phrase at the index j is a cataphora of the noun phrase at the index i. Further, a false output from the binary cataphoric function indicates that the noun phrase at the index j is not an anaphora of the noun phrase at the index i. Accordingly, based on the output of these anaphoric and cataphoric functions, the co-reference resolution module 1008 can be configured to determine anaphoric and cataphoric co-referential relationships the noun phrases of the document 101.

In addition, the co-reference resolution module 1008 can be configured to add or remove the one or more feature functions. In an example, the user may add or remove the one or more feature functions using the parameters 502 of the configuration module 116. The one or more feature functions can be added or removed according to domain and language of the document 101.

Additionally, the co-reference resolution module 1008 can be configured to assign a score to every co-reference relationship based on the type of the co-reference. The co-reference resolution module 1008 may include a co-reference relationship scoring algorithm configured to score every co-reference relationship based on the type of co-reference. In an embodiment, the score for the co-reference relationship can be derived using weights assigned to the feature functions. For example, W can be the weight function giving static (or learned) weights to each of the functions in F. Specifically, W is a vector containing $w_0$, $w_1$, and $w_k$, where $w_i$ is the weight for the function $f_i$ such that, $$\sum_{0}^{K} w_k = 100$$

The $w_k$ can either be determined using a supervised algorithm using graphical models (on a data-set) or can be defined empirically. Accordingly, the co-reference resolution module 1008 can be configured to determine the strength of the semantic similarities between the two sentences or the clauses of the document 101. For example, the strength of semantic similarity between a sentence Sa (with M noun-phrases) and a sentence Sb (with N noun-phrases) in the document 101 can be represented by S (a, b)

$$S(a,b) = \sum_{i=1}^{M} \sum_{j=0}^{N} \sum_{k=0}^{K} w_k \cdot f_k(x_i, x_j)$$

Similarly, the strength of semantic similarity between a clause Ca (with P noun-phrases) and a clause Cb (with Q noun-phrases) in the document 101 can be represented by C (a, b)

$$C(a,b) = \sum_{i=1}^{P} \sum_{j=0}^{Q} \sum_{k=0}^{K} w_k \cdot f_k(x_i, x_j)$$

Figure 11B:
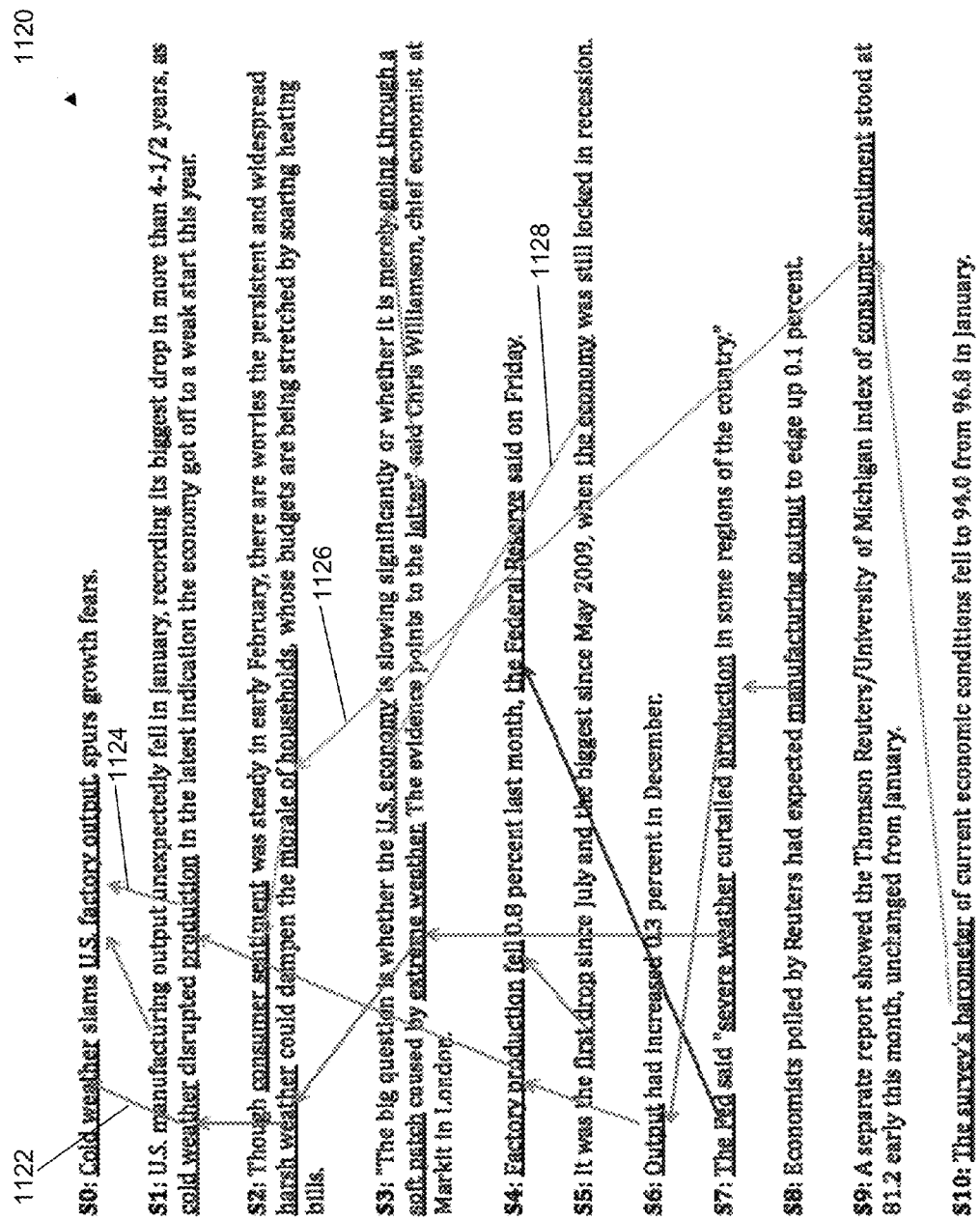

The document map resolution module 1010 can be configured to generate a map based on an output of the co-reference resolution module 1008, i.e., based on the identified co-reference relationships of the noun phrases. In an embodiment, the document map resolution module 1010 can be configured to generate a document map similar to a map 1120 as illustrated in FIG. 11B. The map 1120 is a graph of sentences depicting various co-reference relationships to each other. In an example, if the sentences S0-S10 of FIG. 7B are subjected to the co-reference resolution module 1008, the document map resolution module 1010 generates the document map 1120 indicating various co-reference relationships identified between the noun phrases of the sentences S0-S10.

As shown, the collapsing multiple arrows, such as arrows 1122, 1124, 1126 or 1128, indicate co-reference relationships between the noun phrases of the sentences. Additionally, the document map 1120 may depict a score (not shown) based on the strength of co-reference relationship of the noun phrases. For example, every edge between two sentences holds the sum of co-reference scores between the noun-phrases of these two sentences.

Further, based on the co-reference relationship score, the clustering module 1012 can be configured to create cluster of sentences or clauses. In an embodiment, the sentence clustering module 1014 can be configured to cluster the sentences based on the co-reference relationship scores. As shown in FIG. 11C, the several clusters, namely cluster 0 through cluster 4, are formed based on the respective co-reference scores. For example, when the sentences of the document map 1120 are subjected to the sentence clustering module 1014, the cluster 0 through cluster 4 are formed based on the co-reference relationship scores of the noun phrases of the sentences. Specifically, from the document-map 1120, some edges, with weights less than a threshold, are dropped and the resulting graph is a collection of sub-graphs where there are no edges between any two sub-graphs. Each of these sub-graphs is a contextual cluster. The context of a cluster may be identified based on the co-referential noun phrases. Moreover, the threshold that is determined is static and is found using empirical methods using linguistic rules.

In one embodiment, based on the co-reference relationship score clustering of clauses can also be achieved. The clause clustering module 1016 can be configured to cluster the clauses based on the co-reference relationship scores. A specific clause cluster can include one or more clauses that are contextually similar to each other. Further, the clause clustering module 1016 can be configured to generate the clause clusters in a way such that a clause from a first cluster is not in context with another clause in a second cluster. As a result, the clause clusters as generated by the clause clustering module 1016 can eliminate false positives.

In an embodiment, the methods and systems described herein enable the user to control the processing of the various modules of the linguistic analysis layer 532 using the parameters 502 of the configuration module 116. In an example, the user can input the clause generation related configuration parameters for the clause generation module 1002 through the parameters 502 of the configuration module 116. Similarly, the user can modify rules for the conjunction resolution module 1004 for example, by providing a resolution related input for the conjunction resolution module 1004. In an example, the user can input dependency related inputs using the parameters 502 for the clause dependency parsing module 1006. The methods and systems described herein enable the user to input the threshold value for the co-referential scores that can be used to modify the generation of clusters. Such control in the execution of the modules can enable the user to control the input for the ontology generation module 114.

Figure 12:
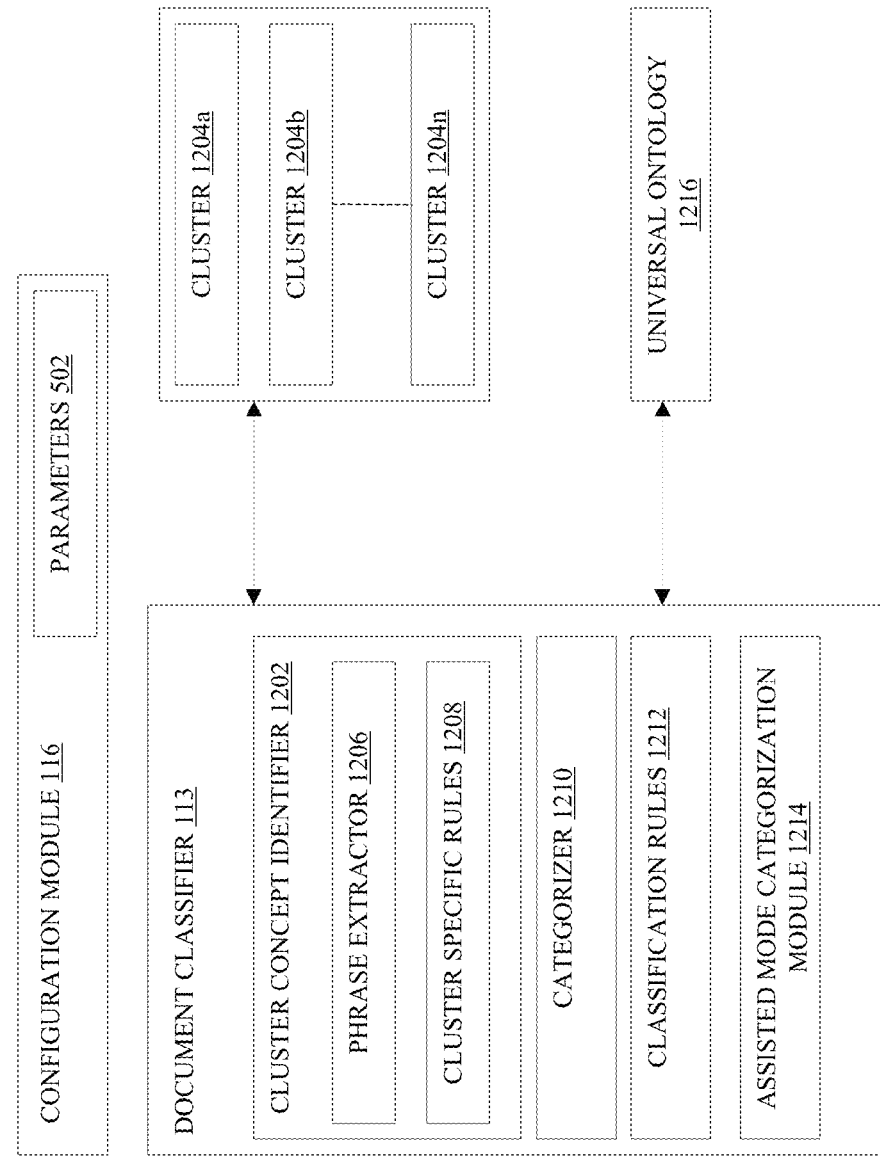
FIG. 12 illustrates an exemplary embodiment of a functional block diagram for classifying the document into one or more categories according to one or more embodiments of the invention.

FIG. 12 illustrates an exemplary embodiment of a block diagram of the document classifier 113 configured to classify the document 101 according to one or more embodiments of the invention. The document classifier 113 can be configured to include a cluster concept identifier 1202 configured to identify one or more concepts from a plurality of clusters such as a cluster 1204a, a cluster 1204b, and a cluster 1204n (collectively referred herein to as a cluster 1204) determined from the document 101. In an embodiment, the cluster concept identifier 1202 can be configured to include a phrase extractor 1206 and one or more cluster specific rules 1208 to identify one or more representative concepts for the each cluster 1204 of the document 101. The respective representative concepts of the clusters 1204 represents the content corresponding to the respective clusters 1204.

In an embodiment, the phrase extractor 1206 can be configured to extract one or more noun phrases available within the cluster 1204a of the document 101. Further, the phrase extractor 1206 can be configured to determine variants of each of the one or more noun phrases identified in the cluster 1204a of the document 101. For example, the phrase extractor 1206 may determine a noun phrase such as factory output in the cluster 1204a and other noun phrases such as factory production, output of the factory, production of the factory or other similar noun phrases as variants of the noun phrase "factory output". The phrase extractor 1206 can be configured to generate a group of such similar noun phrases and determine a representative noun phrase of the group including the similar noun phrases. For example, the phrase extractor 1206 may determine the noun phrase "factory output" as the representative noun phrase of the aforementioned group including similar noun phrases related to the "factory output". In an embodiment, the phrase extractor 1206 can be configured to determine a particular noun phrase as the representative noun phrase of the group of similar noun phrases such that the particular noun phrase have tokens which are present in all the noun phrases of the group. Further, the phrase extractor 1206 can be configured to identify the plurality of groups including similar noun phrases and the respective representative noun phrase for each group member of the plurality of groups.

In an embodiment, the cluster concept identifier 1202 can be configured to access the one or more cluster specific rules 1208 so as to determine the representative concept for the cluster 1202a of the document 101 using the plurality of groups including the similar noun phrases and representative noun phrases of these groups. In an example, the phrase extractor 1206 can be configured to determine the count of the noun phrases found in each group member of the plurality of groups. The cluster specific rules 1208 can include information to select the representative noun phrase of a particular group as the representative concept of the cluster 1204a such that the particular group has the highest count of variants of noun phrases. In another example, the cluster specific rules 1208 can include information to consider the representative noun phrases of the plurality of groups as the representative concepts of the cluster 1204a such that the each group member of the plurality of groups includes a count of variants of noun phrases greater than a threshold count.

In an embodiment, the cluster specific rules 1208 can include information to assign a plurality of priority scores to the noun phrases identified within the cluster 1204a so that the phrase extractor 1206 can be configured to determine the one or more representative concepts for the cluster 1204a using the plurality of priority scores. In an example, a first priority score is assigned to the noun phrases when it is determined that a subject is identified within the noun phrase. Similarly, a second priority score is assigned to the noun phrase when one or more attributes of the document 101 are identified in the noun phrase. For example, phrase extractor 1206 assigns the second priority score to the noun phrase when at least a portion of the title of the document 101 is identified in the noun phrase. Subsequently, the phrase extractor 1206 can be configured to compute the first and second priority scores of the noun phrase and generate a list of the noun phrases ranked in accordance with the priority scores. Further, the phrase extractor 1206 can be configured to access the cluster specific rules 1208 to select top listed noun phrases as the representative concepts of the cluster 1204a.

The representative concept of the cluster 1204a indicates noun phrases that can have more linguistic importance than other noun-phrases of the cluster 1204a. Similarly, the cluster concept identifier 1202 can be configured to identify one or more representative concepts for each of the other clusters such as the cluster 1204b and the cluster 1204n of the document 101.

In an embodiment, one or more categories for the document 101 are identified using the one or more representative concepts of the clusters 1204 and the classification rules 1212. For example, a categorizer 1210 can be configured to access at least one rule from the classification rules 1212 so as to determine the one or more categories of the document 101.

In an embodiment, the classification rules 1212 can include information to determine a primary cluster from the one or more clusters 1204 of the document 101 and determine the one or more categories of the document 101 using the representative concept of the primary cluster of the document 101. The classification rules 1212 can further include various rules to determine the primary cluster of the document 101. For example, the specific cluster can be considered as the primary cluster when the title of the document 101 is determined to be within the specific cluster. In another example, the specific cluster can be considered as the primary cluster if a maximum numbers of sentences are identified in the specific cluster. In a yet another example, the specific cluster can be considered as the primary cluster if the specific cluster spans across the maximum number of sentences of the document 101.

In an embodiment, the classification rules 1212 can include information to assign score to each representative concept of the each cluster and the categorizer 1210 can be configured to determine the one or more categories of the document 101 by selecting only those representative concepts of the clusters which have scores greater than a threshold score value. Accordingly, the document classifier 113 classifies the document 101 into the one or more categories that are derived from the representative concepts of the clusters which have scores greater than a threshold score value.

In an embodiment, the classification rules 1212 can include information to determine the strength of the cluster from the strength of the relationships between the sentences of the cluster. Accordingly, the cluster having the maximum strength among the plurality of clusters is determined. The classification rules 1212 can include information to consider the representative concepts of the cluster having the maximum strength to derive the one or more categories for the document 101.

In an embodiment, the document classifier 113 can be configured to identify additional categories for the document 101 using an assisted mode categorization module 1214. The assisted mode categorization module 1214 enables the document classifier 113 to consider categories for the document 101 which may be predefined and delivered to the document classifier 113 in the form of the parameters 502 of the configuration module 116. For example, keywords for the categories may be extracted from sources outside the document 101 (e.g., from universal ontology 1216) and the document classifier 113 can be configured to determine whether the document 101 can be classified in the categories extracted from such outside sources.

In an embodiment, the assisted mode categorization module 1214 can be configured to receive the keywords for the categories from the universal ontology 1216 or from the user. For example, the user may desire to examine that whether the document 101 can be classified into a category "cloud computing". Such keywords may be provided either automatically or manually through the parameters 502 of the configuration module 116. Accordingly, the document classifier 113 can be configured to determine the contextual strength of the provided categories with respect to content of the clusters of the document 101 using the assisted mode categorization module 1214.

In an embodiment, the assisted mode categorization module 1214 can be configured to ascertain the contextual strength of the keywords and the content of the cluster if the keyword is contextually relevant to the content of the cluster. Further, the assisted mode categorization module 1214 can be configured to determine one or more levels of contextual relevancy such as a compound concept context relevancy, a subject-verb-object (SVO) context relevancy, same clause context relevancy, same sentence context relevancy, medium context relevancy (e.g., consecutive N clauses in the cluster), loose context relevancy (e.g., anywhere in the cluster), global loose context relevancy (e.g., anywhere in the document) or any combinations thereof to validate that the document 101 can be classified into the categories as provided from the sources outside the document 101. In addition, the assisted mode categorization module 1214 can be configured to categorize the document 101 at multiple levels. For example, using keywords from multiple ontologies, the assisted mode categorization module 1214 can categorize a specific document into the multiple levels of categories such as type of industry, originating place of the document, presence of certain concepts in the document and the like.

Figure 13:
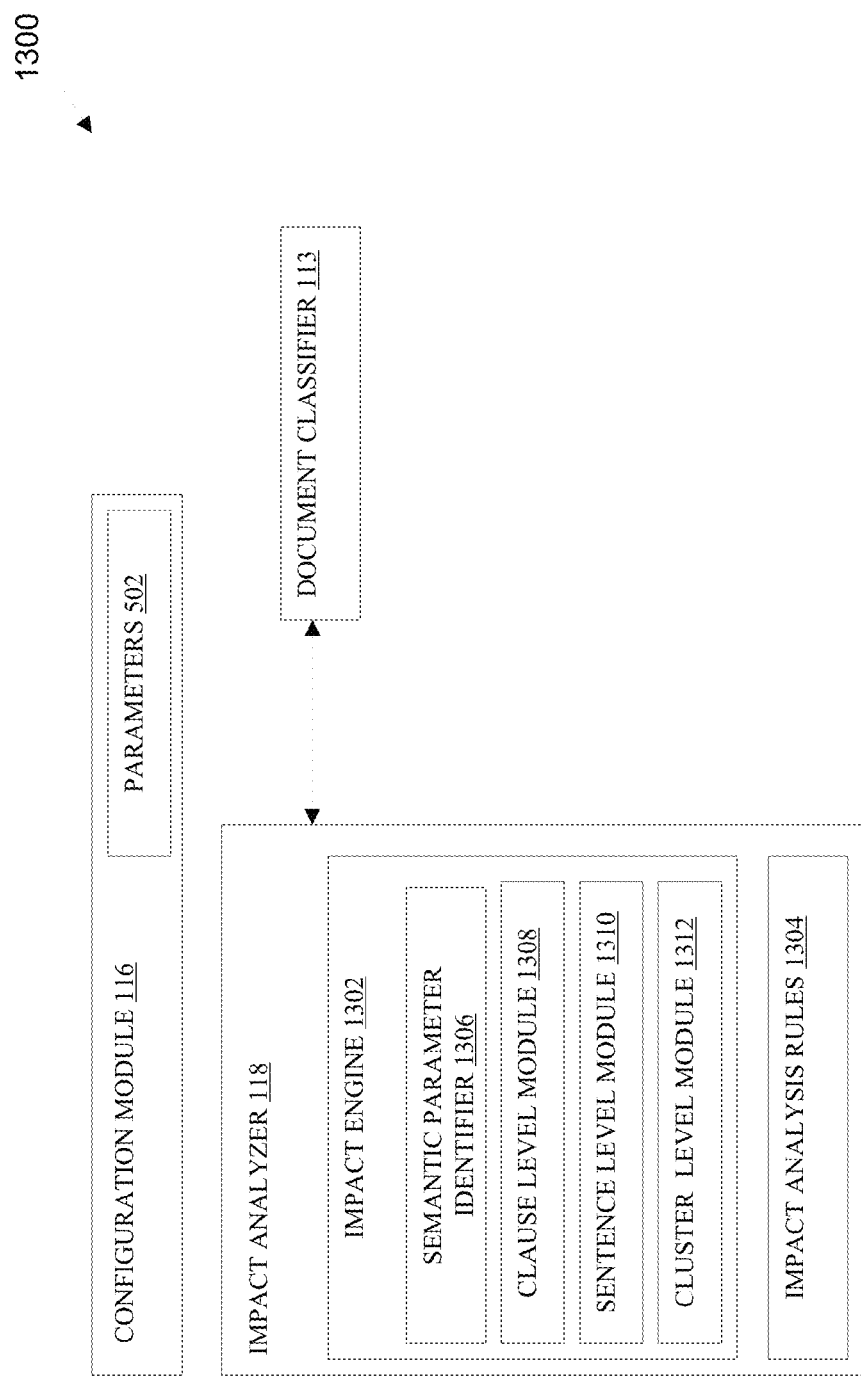
FIG. 13 illustrates an exemplary embodiment of a functional block diagram for determining an impact of the document on the one or more categories according to one or more embodiments of the invention.

FIG. 13 illustrates an exemplary embodiment of the impact analyzer 118 configured to determine an impact of the document on the one or more categories of the document in accordance with one or more embodiments of the invention. The impact analyzer 118 includes an impact engine 1302 configured to process one or more instructions using impact analysis rules 1304 to determine the impact of the document 101 on the one or more categories. The impact engine 1302 includes a semantic parameter identifier 1306 and a plurality of modules such as a clause level module 1308, a sentence level module 1310 and a cluster level module 1312. The semantic parameter identifier 1306 determines one or more semantic parameters for each clause of the cluster of the document 101. Further, the plurality of modules are processed to determine the impact of a specific clause, a specific sentence or a specific cluster on the one or more categories using the one or more semantic parameters and the impact engine 1302 determines the impact of the document 101 on the one or more categories using the output from the plurality of modules of the impact engine 1302 and instructions disclosed within the impact analysis rules 1304.

In an embodiment, an exemplary document 101 such as shown in FIG. 14 can be extracted from the data store 202 using the content extractor 206. Further, various sentences within the exemplary document 101 of FIG. 14 can be identified using the sentence detection module 610 of the text processing layer 512. As illustrated, a total of six sentences (labeled as S0-S6) are identified in the document 101 of FIG. 14. As explained earlier in the description, the co-reference resolution module 1008 can be configured to determine the co-referential sentences within the document 101 and subsequently, one or more clusters of the sentences are identified using the clustering module 1012. FIGS. 15a and 15B illustrate two clusters namely cluster 0 and cluster 1 of the document 101. The cluster 0 includes the sentences S0-S4 of the document 101 and the cluster 1 includes the sentences S5-S6 of the document 101. Each sentence of the respective clusters is further decomposed into the corresponding one or more clauses. In an embodiment, the cluster 0 is determined as a primary cluster of the document 101 whereas the cluster 1 is determined as a secondary cluster of the document 101.

After determination of the clusters and type thereof, the semantic parameter identifier 1306 can be configured to determine values for one or more semantic parameters for each clause of the clusters (e.g., cluster 0 and cluster 1). The semantic parameters can include but not limited to parameters corresponding to a representative concept of a clause, an impact of the clause, an intensity of the impact of the clause, an object disclosed within the clause, quantitative parameters within the clause, time and location related parameters and any other parameters that can assist in determination of the impact caused by the clause of the cluster.

The semantic parameter identifier 1306 can be configured to include one or more linguistic rules so as to determine the values of the semantic parameters. In an embodiment, the one or more linguistic rules can include instructions to determine verb orientation of a verb disclosed in the clause of the cluster. Subsequently, a subject or an object of the clause can be considered as the representative concept of the clause using the verb orientation of the verb of the clause. In an example, the verb orientation may be derived using a suitable semantic lexicon such as a Wordnet or a Verbnet. In another example, the linguistic rules can include instructions to determine the impact of the clause on a specific category. For example, the linguistic rules can include instructions to determine the verb (i.e., action) of the clause as the impact of the clause when the representative concept of the clause falls into any one of classes such as an actor, an agent, a beneficiary, an experiencer, a theme or a patient as defined in the semantic lexicon such as the Verbnet.

Further, the linguistic rules can include instructions to determine intensity of the impact of the clause using adverbs, noun-forms of verbs, or phrases (e.g., more than expected) that can add more information to the action or the representative concept of the clause. The linguistic rules can include instructions to restrict the impacts of the representative concepts of the cluster only to certain contexts such as objects of the clause of the cluster. In addition, the linguistic rules can include instructions to determine other semantic parameters to determine the impact of the document.

In an embodiment, the clause level module 1308 can be configured to utilize the output of the semantic parameter identifier 1306 in combination with the impact analysis rules 1304 to determine the impact at the cluster level of the document 101. The impact analysis rules 1304 can be configured to include instructions to determine the impact using the values corresponding to the one or more semantic parameters. These rules can be defined, refined, added or removed depending on the domain of the document 101 or as and when required by the user. The impact analysis rules 1304 can be configured to include instructions to assign a rating and a direction of the impact at the clause level of the one or more categories. The direction of the impact can be positive, neutral or negative and can depend on the intensity of the impact as determined using the semantic parameter identifier 1306.

Referring to FIGS. 16A, 16B and 16C, the one or more semantic parameters for the each clause of the cluster 0 and cluster 1 of the exemplary document 101 are determined. The semantic parameter identifier 1306 determines the value for the one or more semantic parameters in accordance with the instructions available in the impact analysis rules 1304. A table 1600 of FIGS. 16A, 16B and 16C depict the values of the semantic parameters for the each clause of the sentences S0, S3 and S4. The semantic parameter identifier 1306 identifies the representative concepts of the clauses of the respective sentences of the cluster 0 which has been categorized into a category of "performance of public funds".

In an embodiment, the clause level module 1308 can be configured to determine the impact rating of the clauses of the respective sentences of the cluster. For example, FIG. 17 depicts an exemplary table 1700 listing exemplary impact analysis rules 1304 for determining the impact ratings of the clause. As illustrated, an impact rating of 1 is given to a specific clause when it is determined that the verb class of the specific clause is identified as "better" and the cluster of the respective clause is categorized into the category "performance of public funds". Accordingly, the clause CL0 of the sentence S0 of the cluster 0 is given an impact rating of 1 using the impact rules of the table 1700. Similarly, impact ratings for other clauses of the cluster 0 can be determined.

In addition, the impact analysis rules 1304 can be configured to include instructions to compute an impact rating of the specific clause based on the context or the intensity of the impact. As illustrated in FIG. 16A, the clause rating for the clause CL0 of the sentence S4 is determined to be 1.2 because of the presence of object dependent rating and the intensity dependent rating. In an embodiment, the one or more impact analysis rules 1304 can be modified, added, or removed depending on the user requirement. The clause level module 1308 determines the rating for the clauses of the respective sentences of the cluster based on these impact analysis rules 1304.

In an embodiment, the sentence level module 1310 can be configured to determine impact ratings of the each sentence of the cluster using the impact ratings of the respective clauses and the impact analysis rules 1304. The impact ratings of the two or more clauses of the sentence can be added or subtracted depending on the relationships between the two or more clauses of the sentence of the cluster. For example, the impact rating of the sentence S1 of the cluster 0 are obtained by combining the positively valued impact ratings of the respective clauses, whereas the impact rating of the sentence S2 of the cluster 0 are obtained by combining the positively valued impact rating of the clause CL0 and the negatively valued impact rating of the clause CL1 respectively.

Further, the impact analysis rules 1304 can be configured to include instructions to handle sentence-level impact-reversals by negating relationships (e.g., contra-expectations) amongst a subordinate clause and the main clause of the respective sentence. The degree to which the impact of the subordinate-clause of the sentence affects the impact of the main clause of the same sentence can be defined externally by matching cue words (e.g., additionally, however, in spite of, and the like) using the impact analysis rules 1304. Accordingly, the cluster level module 1312 can be configured to determine the impact ratings for the cluster using the impact ratings of the respective sentences of the cluster and the impact analysis rules 1304. For example, the impact rating of the cluster 0 can be determined as:

$$IR_{Cluster\ 0} = aIR_{S0} + bIR_{S1} + cIR_{S2} + dIR_{S3} + eIR_{S4} \qquad -eq(1)$$

Wherein IR denotes the respective impact ratings and a, b, c, d and e are weightings given to the respective sentences of the cluster. In an example, the values of the weightings can be derived from the impact analysis rules 1304. Using the equation 1, the impact rating of the cluster 0 is computed as 1.0 [$aIR_{S0}$]+0.8 [$bIR_{S1}$]+(−2.0)*(−1.0) [$cIR_{S2}$]+1.0 [$dIR_{S3}$]+1.2 [$eIR_{S4}$]=6.0. The value of c reflects the presence of the cue word "however" that changes the rating direction of the previous positive rating of the sentence S2 of the cluster 0. Similarly, the impact rating of the cluster 1 can be determined using the impact ratings of the sentences S5 and S6 respectively.

In an embodiment, the impact analysis rules 1304 can be configured to include instructions to compute the impact rating of the cluster by assigning a priority score to the sentences of the cluster. For example, a particular sentence including one or more keywords of the representative concept of the cluster or the category of the cluster is given a relatively more priority score than other sentences of the cluster. For example, the priority scores can be assigned using the respective weightings of the sentences.

Further, the impact engine 1302 can be configured to compute the impact ratings of the document 101 using the impact ratings of the respective clusters in accordance with the impact analysis rules 1304. In an example, the impact analysis rules 1304 can be configured to include instructions to determine the impact rating of the document 101 using a primary cluster of the document 101. Accordingly, the impact rating of the document 101 is computed using the impact rating of cluster 0 (i.e., the primary cluster). In another example, the impact analysis rules 1304 can be configured to include instructions to derive the impact ratings of the document 101 on the one or more categories using each cluster of the document 101. Accordingly, the impact rating of the document 101 is computed using the impact ratings of the cluster 0 and cluster 1.

Figure 18:
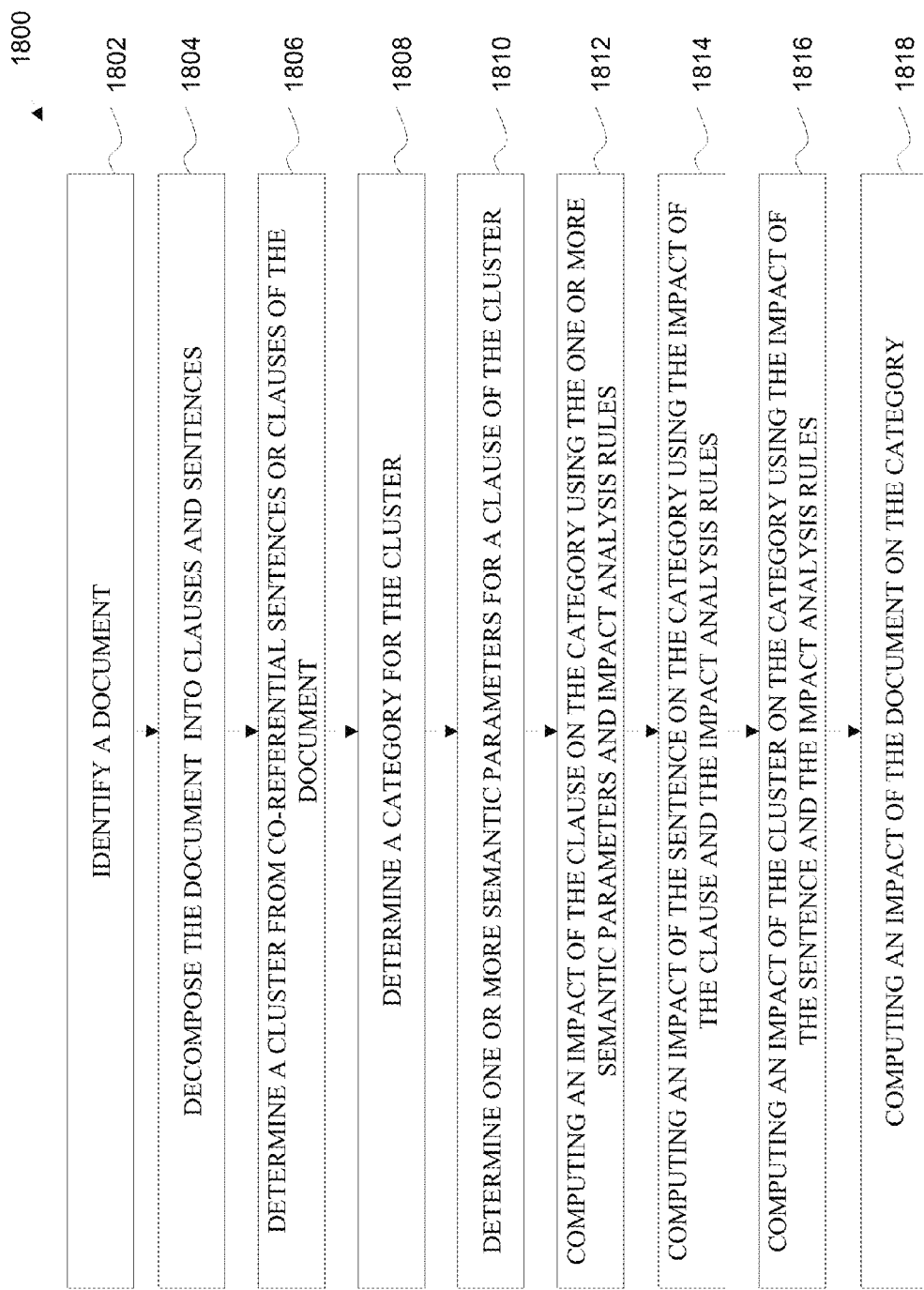
FIG. 18 illustrates an exemplary embodiment of a method for determining an impact of a document on one or more categories of the document according to one or more embodiments of the invention.

FIG. 18 illustrates an embodiment of a method for determining an impact of a document on one or more categories of the document in accordance with the one or more embodiments of the invention. The method 1800 initiates at step 1802, where the method 1800 can be configured to identify the document. In an embodiment, the document is identified in accordance with the requirements of the user. In an embodiment, the user inputs the documents so as to determine the impact of the document on the user specified categories.

At step 1804, the method 1800 can be configured to decompose the document into clauses and sentences. At step 1806, the method 1800 can be configured to determine a cluster from one or more co-referential sentences or clauses of the document. In an embodiment, a sentence cluster is determined from a set of co-referential sentences of the document. In an embodiment, a clause cluster is determined from a set of co-referential clauses of the document. At step 1808, the method 1800 can be configured to determine a category for the cluster. For example, "performance of public funds" is determined as the category for the cluster 1 of the exemplary document 101. In an embodiment, the document classifier 113 can be configured to determine the category of the cluster using the one or more representative concepts of the cluster. In an embodiment, the document classifier 113 can be configured to map the document into a category as listed in ontology of a discourse.

At step 1810, the method 1800 can be configured to determine one or more semantic parameters for a clause of the cluster. In an embodiment, the one or more semantic parameters can include but not limited to parameters corresponding to a representative concept of the clause, an impact of the clause, an intensity of the impact of the clause, an object disclosed within the clause, one or more quantitative parameters within the clause, time and location related parameters and any other parameters that can assist in determination of the impact caused by the clause of the cluster. At step 1812, the method 1800 can be configured to compute an impact of the clause on the category using the one or more semantic parameters and impact analysis rules. The impact analysis rules can be configured to include instructions to determine an impact rating and a direction of the impact of the clause on the category.

At step 1814, the method 1800 can be configured to compute an impact of the sentence of the cluster on the category using the impact of the clause and the impact analysis rules. In an embodiment, the impact analysis rules can be configured to include instructions to handle sentence-level impact-reversals by negating relationships (e.g., contra-expectations) amongst a subordinate clause and the main clause of the respective sentence. The degree to which the impact of the subordinate-clause of the sentence affects the impact of the main clause of the same sentence can be defined externally by matching cue words (e.g., additionally, however, in spite of, and the like) using the impact analysis rules. At step 1816, the method 1800 can be configured to compute an impact of the cluster on the category using the impact of the sentence and the impact analysis rules. At step 1818, the method 1800 can be configured to compute an impact of the document on the category using the impact of the cluster and the impact analysis rules.

The methods and systems described herein described herein can be configured to compute the contextual impact of the document. For example, a specific document related to increase in oil prices can create a positive impact in an oil industry whereas the same document can create a negative impact on the oil consumption related industries. The methods and systems described herein can compute all types of impacts of the document depending on the desired context. Further, the methods and systems described herein can be configured to assess the potential impact of the document on a specific concept of interest including the analysis of sentiments of specific stakeholders that may be expressed in the document.

Although the foregoing embodiments have been described with a certain level of detail for purposes of clarity, it is noted that certain changes and modifications can be practiced within the scope of the appended claims. Accordingly, the provided embodiments are to be considered illustrative and not restrictive, not limited by the details presented herein, and may be modified within the scope and equivalents of the appended claims.

What is claimed:

1. A computer implemented method for automatically determining an impact of a document on a topic of interest, without any programming, using linguistic analysis, wherein the same text can have different impact for different topics of interest, without using statistical methods and frequency or word pattern based methods, the method comprising instructions carried out by a processor of the computer for:

generating at least one cluster of document text from a plurality of semantically related textual clauses across multiple sentences of text of a single document through co-referencing without statistical methods or frequency or word pattern based methods, or any manual review, by applying semantic relationship strength rules based on the type of co-referential relationship in the text;

identifying at least one representative concept from the document text from a plurality of concepts of the at least one cluster of semantically related sentences from the same document, using priority scores assigned using configurable linguistic rules; wherein the representative concept can be from any sentence in the cluster; wherein other non-representative concepts are not considered for further analysis and where the same representative concept may not be representative in another document;

determining at least one category for the document based only on one or more representative concepts of the one or more cluster of semantically related sentences, using configurable classification rules;

computing an impact of a first clause of text of the at least one cluster of semantically related text sentences from the same document with respect to the at least one category using at least one configurable linguistic impact analysis rule using part of speech roles of words in the clause without statistical methods or frequency of words or patterns, or use of other documents and where the impact is not the same for every instance of the clause across different documents or for the same clause for every category;

calculating an impact of the at least one cluster on the at least one category by aggregating the impact of all clauses of all semantically related sentences in the cluster in the same document in accordance with at least one configurable impact analysis rule using part of speech roles of words in the clause text, without statistical methods or frequency of words or patterns; wherein the impact of various clauses can negate or amplify the overall impact; wherein the impact is not the same for every instance of the clause across different documents or for the same clause for every category; and calculating the impact of the document on the at least one category by aggregating the impact of all clusters of semantically related sentences in the same document in accordance with at least one configurable document level impact analysis rule pertaining to how the impact of various clusters are to be combined.

2. The method of claim 1, further comprising:
computing an impact of a second clause of the at least one cluster with respect to the at least one category; wherein the first clause and the second clause of the at least one cluster corresponds to at least one sentence of the at least one cluster of semantically related sentences from the same document; wherein the wherein the impact is calculated using the part of speech roles of the words in the clause and ascertaining their meaning; wherein the impact of the second clause can adjust the impact of the first clause based on a conjunctive relationship between the first and second clause.

3. The method of claim 2, further comprising:
determining an impact of the at least one sentence by aggregating the impacts of the first clause and the second clause using configurable impact analysis rules which can be based on the conjunctive relationship between the clauses and specify clause level weights for aggregation; where the conjunctive relationships between the clauses of the same sentence can cause the impact of the sentence to increase or decrease.

4. The method of claim 1, further comprising:
selecting at least one clause level impact analysis rule from a plurality of configurable impact analysis rules where the rules are based on the part of speech roles of the words in the clause without statistical methods, frequency or word pattern based methods.

5. The method of claim 4, further comprising:
managing the at least one impact analysis rule from the plurality of the impact analysis rules through configuration without programming or the use of statistical methods or frequency or word patterns.

6. The method of claim 5, wherein managing the at least one impact analysis rule comprises at least one of: defining, modifying, adding and deleting the at least one impact analysis rule from the plurality of the impact analysis rules without programming or the use of statistical methods or frequency or word patterns.

7. The method of claim 1, further comprising:
computing the impact of the at least one cluster having one or more semantically related clauses sentences in the same document as the aggregate impact of the sentences of the at least one cluster of the same document, using configurable weights for each of the sentences.

8. The method of claim 1, wherein computing the impact of the first clause comprises computing a rating score and a direction of the impact of the first clause with respect to the at least one category of the document; wherein the same clause can have a different rating score and direction for different categories.

9. The method of claim 1, further comprising:
determining at least one semantic parameter within the first clause using at least
one linguistic analysis rule based on parts of speech roles of the words in the clause; and computing the impact of the first clause of the at least one cluster with respect to the at least one category using the at least one semantic parameter.

10. The method of claim 9 wherein the at least one semantic parameter comprises at least one of: a representative concept of the document, an impact phrase, an intensity corresponding to the impact phrase, object, subject, time-period corresponding to the impact phrase and a location and is not related to frequency or word patterns.

11. The method of claim 1, wherein the method is tractable.

12. The method of claim 1, further comprising: automatically generating clusters of semantically related clauses from different sentences in the same document using co-referential relationship scores; wherein the co-referential score is determined by a scoring algorithm based on the type of co-reference without statistical methods or frequency or word patterns.

13. The method of claim 1, further comprising: automatically generating clusters of semantically related sentences in the same document using co-referential relationship scores; wherein the co-referential score is determined by a scoring algorithm based on the type of co-reference without statistical methods or frequency or word patterns.

14. The method of claim 1, further comprising:
determining a primary cluster from multiple clusters of semantically related clauses across multiple sentences in the same document using the at least one cluster level rule to determine the primary cluster, without statistical methods or frequency or word patterns.

15. The method of claim 14, further comprising:
determining the representative concept for each cluster based on the linguistic importance such as noun phrase with the subject of the sentence, noun phrase with parts of title, without the use of any external domain specific taxonomy.

16. The method of claim 1, further comprising:
determining additional categories to classify the document into by selecting the representative concepts of the multiple clusters of the same document that exceed a threshold value and using classification rules that reflect a scoring algorithm to score each representative concept.

17. The method of claim 16, further comprising: determining categories to classify the document into using representative concepts identified in a user assisted mode and using the at least one classification rule.

18. A computer system for determining an impact of text in a document using linguistic analysis, without using statistical methods, and frequency or word pattern based methods, wherein the same text can have different impact for different topics of interest, the system comprising:

a processor within the computer system;

a cluster generating module configured to generate at least one cluster from a plurality of semantically related clauses across multiple sentences of text of a single document through co-referencing, without statistical methods or frequency or word pattern based methods or any manual review and by applying semantic relationship strength rules based on the type of co-referential relationship in the text;

a cluster concept identifier to identify at least one representative concept for the at least one cluster using linguistic rules, wherein the representative concept can be from any sentence in the cluster; wherein other non-representative concepts are not considered for further analysis and where the same representative concept may not be representative in another document; and an impact analyzer including:

a semantic parameter identifier configured to determine at least one semantic parameter for a first representative clause of the at least one cluster;

at least one configurable linguistic impact analysis rule using parts of speech roles of the words in the clause to determine an impact of the first representative clause of the at least one cluster using the at least one semantic parameter; and an impact engine configured to compute the impact of the first representative clause of the at least one cluster using the representative concept and the at least one configurable linguistic impact analysis rule using parts of speech roles of the words in the clause, on the topic of interest, without statistical methods and without frequency and word patterns, and where the impact can be different for every instance of the clause across different documents or for the same clause for different topics of interest.

19. The system of claim 18, further comprising:

a categorizer configured to determine at least one category for the document based on the representative concept of the at least one cluster where the same representative concept can yield different categories for different documents.

20. The system of claim 18, wherein the impact engine computes the impact of the first representative clause of the at least one cluster using the at least one category of the document and the at least one impact analysis rule using parts of speech roles of the words in the clause, on the topic of interest, without statistical methods and without frequency and word patterns.

21. The system of claim 18, wherein the impact engine computes an impact of a second representative clause of the at least one cluster with respect to the category of the document and the at least one impact analysis rule using parts of speech roles of the words in the clause, without statistical methods and without frequency and word patterns, such that the first clause and the second clause of the at least one cluster corresponds to at least one sentence of the at least one cluster from a single document.

22. The system of claim 21, wherein the impact engine determines an impact of at least one sentence from the impacts of the first representative clause and the second representative clause of the at least one cluster of semantically related sentences from a single document, using configurable impact analysis rules which can be based on a conjunctive relationship between the clauses and specify clause level weights for aggregation; where the conjunctive relationships between the clauses of the same sentence can cause the impact of the at least one sentence to increase or decrease; wherein the first and second clause can be from different sentences of the at least one cluster of semantically related sentences from the same document.

23. The system of claim 22, wherein the impact engine determines the impact of the at least one cluster using the impact of the at least one sentence from the same document without regard to statistical methods or frequency or word patterns.

24. The system of claim 23, wherein the impact engine determines the impact of text in the document using the at least one cluster and using the impact of the at least one sentence from the same document without regard to statistical methods or frequency or word patterns.

25. The system of claim 18, wherein the impact engine computing the impact of the first representative clause comprises computing a rating score and a direction of the impact of the first representative clause with respect to the at least one category of the document, wherein the same representative clause can have a different rating score and/or different direction for different categories.

26. The system of claim 18, wherein the at least one semantic parameter comprises at least one of: a representative concept of the document, an impact phrase, an intensity corresponding to the impact phrase, object, subject, time-period corresponding to the impact phrase and a geographical location wherein the semantic parameter is not related to statistical methods or frequency or word patterns.

* * * * *